United States Patent
Bourbeau Hébert et al.

(10) Patent No.: US 10,753,801 B2
(45) Date of Patent: Aug. 25, 2020

(54) METHODS FOR PERFORMING DUAL-COMB INTERFEROMETRY USING A FREQUENCY OFFSET RELATION

(71) Applicant: UNIVERSITÉ LAVAL, Québec (CA)

(72) Inventors: Nicolas Bourbeau Hébert, Trois-Rivières (CA); Jérôme Genest, Québec (CA); Jean-Daniel Deschênes, Québec (CA); David Lancaster, Salisbury Heights, SC (US)

(73) Assignee: UNIVERSITÉ LAVAL, Quebec (CA)

( * ) Notice: Subject to any disclaimer, the term of this patent is extended or adjusted under 35 U.S.C. 154(b) by 0 days.

(21) Appl. No.: 16/467,113

(22) PCT Filed: Dec. 5, 2017

(86) PCT No.: PCT/CA2017/051464
§ 371 (c)(1),
(2) Date: Jun. 6, 2019

(87) PCT Pub. No.: WO2018/102915
PCT Pub. Date: Jun. 14, 2018

(65) Prior Publication Data
US 2019/0391016 A1    Dec. 26, 2019

Related U.S. Application Data

(60) Provisional application No. 62/431,013, filed on Dec. 7, 2016.

(51) Int. Cl.
*G01J 3/453* (2006.01)
*G01B 9/02* (2006.01)
*G01J 3/02* (2006.01)
*G01J 3/42* (2006.01)
*G01S 17/88* (2006.01)

(52) U.S. Cl.
CPC .......... *G01J 3/453* (2013.01); *G01B 9/02008* (2013.01); *G01J 3/0218* (2013.01); *G01J 3/42* (2013.01); *G01S 17/88* (2013.01)

(58) Field of Classification Search
CPC .. G01J 3/453; G01J 3/0218; G01J 3/42; G01J 3/45; G01S 17/88; G01B 9/02008; G01B 9/02007
See application file for complete search history.

(56) References Cited

U.S. PATENT DOCUMENTS 5,293,213 A    3/1994  Klein et al.
5,748,309 A    5/1998  van der Weide et al.
(Continued)

FOREIGN PATENT DOCUMENTS

WO    2007045461 A1    4/2007

OTHER PUBLICATIONS

Ideguchi, T., Nakamura, T., Kobayashi, Y. & Goda, K. Kerr-lens mode-locked bidirectional dual-comb ring laser fort broadband dual-comb spectroscopy. Optica 3, 748-753 (2016).
(Continued)

*Primary Examiner* — Michael P LaPage
(74) *Attorney, Agent, or Firm* — Norton Rose Fulbright Canada LLP; Reno Lessard

(57) ABSTRACT

Methods of performing dual-comb interferometry using a dual-comb interferometer and methods of characterizing a volume using dual-comb interferogram data are described.

19 Claims, 23 Drawing Sheets

(56) References Cited

U.S. PATENT DOCUMENTS

| | | | |
|---|---|---|---|
| 7,483,143 B2 | 1/2009 | Sanders et al. | |
| 8,477,314 B2 | 7/2013 | Giaccari et al. | |
| 8,625,101 B2 | 1/2014 | Giaccari et al. | |
| 2011/0069309 A1* | 3/2011 | Newbury | G01J 3/453 356/326 |
| 2011/0267625 A1 | 11/2011 | Guelachvili et al. | |
| 2014/0253915 A1* | 9/2014 | Ataie | H04B 10/07951 356/300 |

OTHER PUBLICATIONS

Mehravar, S., Norwood, R., Peyghambarian, N. & Kieu, K. Real-time dual-comb spectroscopy with a free-running bidirectionally mode-Locked fiber laser. Appi. Phys. Lett.108, 231104(2016).

Gong, Z., Zhao, X., Hu, G., Liu, J. & Zheng, Z. Polarization multiplexed, dual-frequency uitrashort pulse generation by a birefringent mode-locked fiber laser. In CLEO: Science and Innovations, JTh2A-20 (Optical Society of America, 2014).

Zhao, X. et al. Picometer-resolution dual-comb spectroscopy with a free-running liber laser. Opt. Express 24, 21833-21845 (2016).

Scheller, M,, Baker, C. W., Koch, S. W. & Moloney, J. V. Dual-wavelength passively mode-locked semiconductor disk lasei IEEE Photon. Technol. Lett. 28, 1325-1327 (2016).

Chang, M., Liang, H., Su, K. & Chen, Y. Dual-comb selfmode-iocked monolithic yb: Kgw laser with orthogonal polarizations, Opt. Express 23, 10111-10116 (2015).

Burghoff, D., Yang, Y. & Hu, Q. "Computational multiheterodyne spectroscopy", arXiv preprint arXiv:1605.09436 (2016).

Hébert, N. B., Genest, J., Deschênes, J. D., Bergeron, H., Chen, G. Y., Khurmi, C., & Lancaster, D. G. (2017). Self-corrected chip-based dual-comb spectrometer Optics express, 25(7), 8168-8179.

* cited by examiner

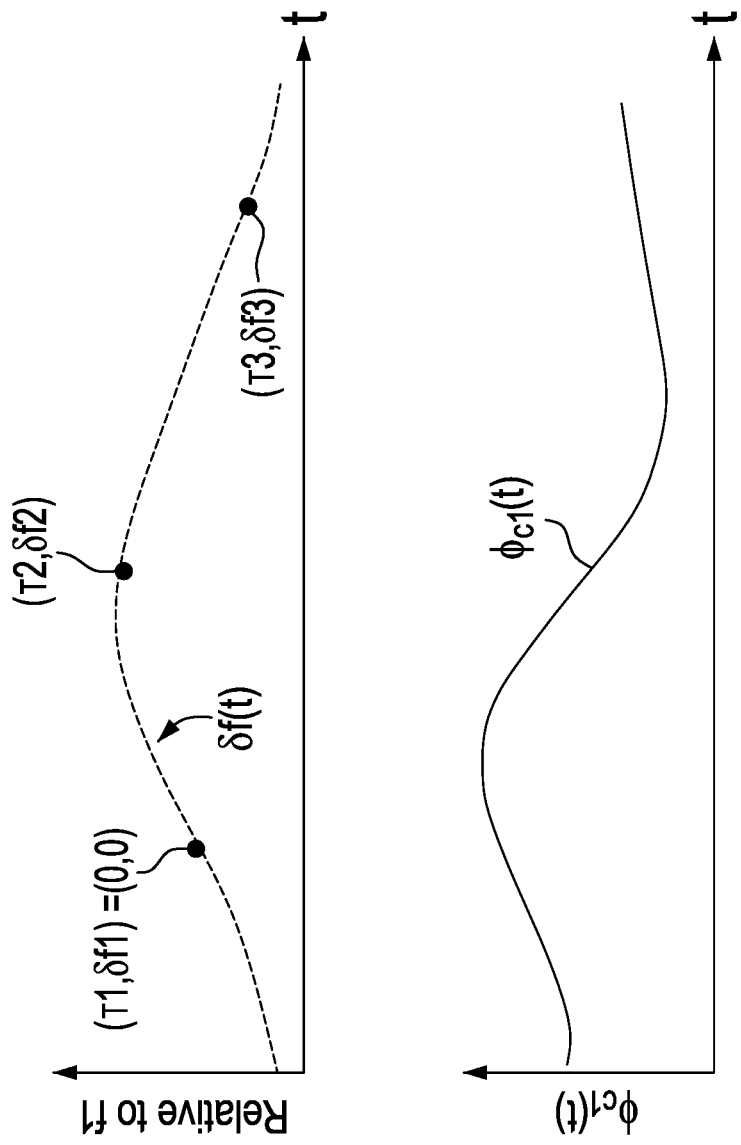

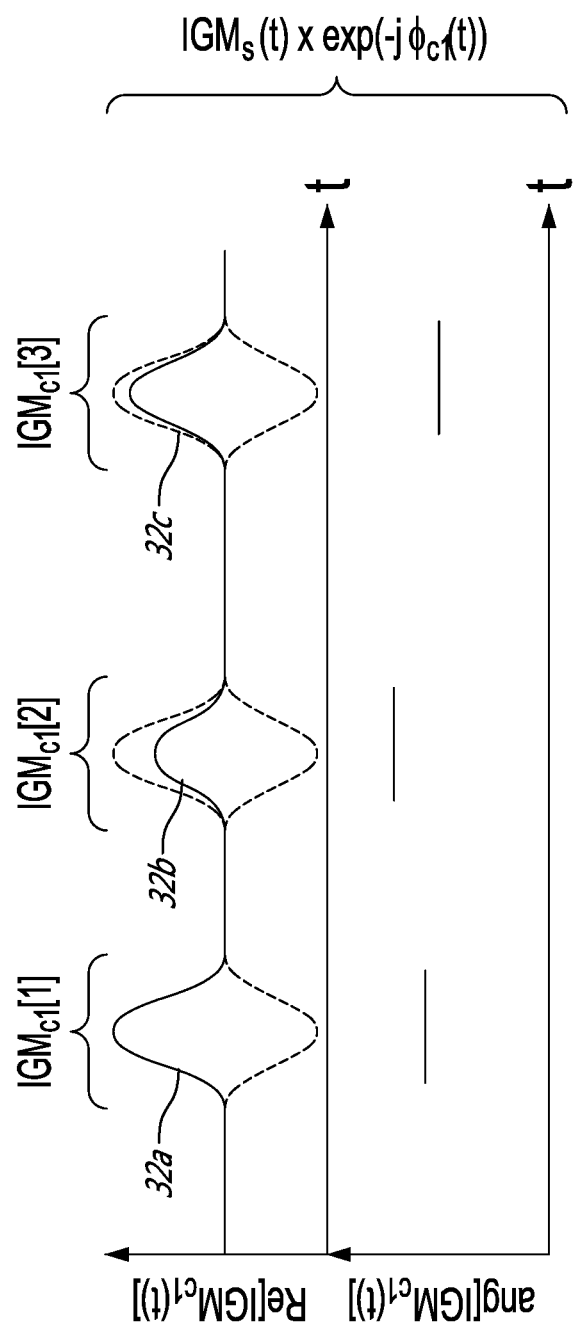

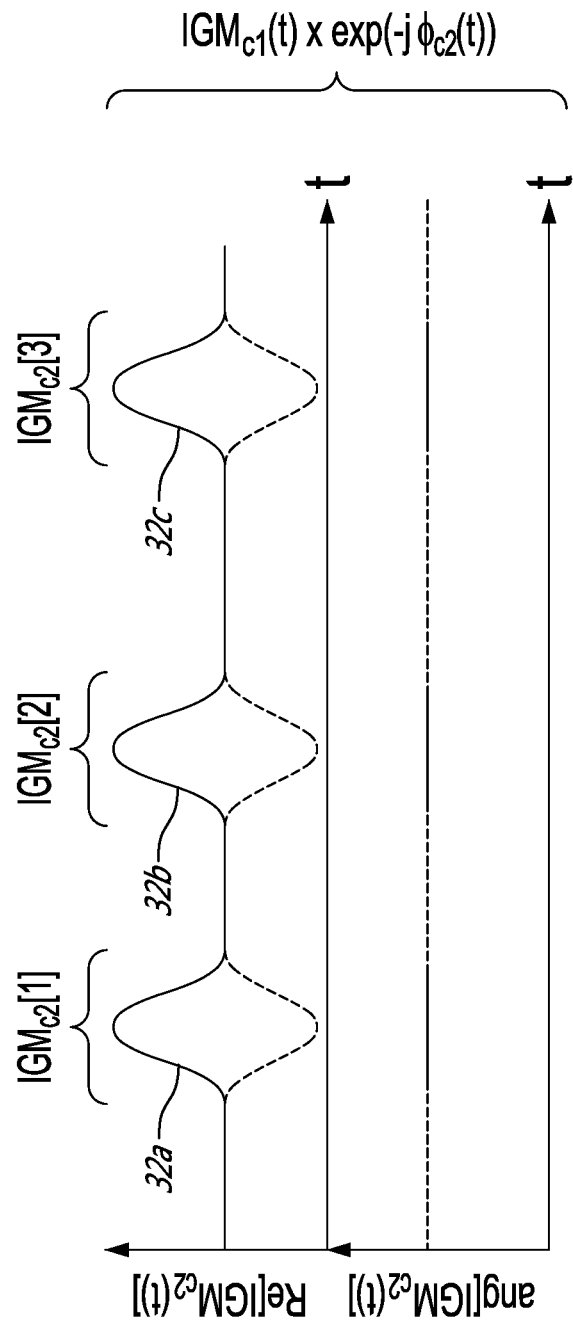

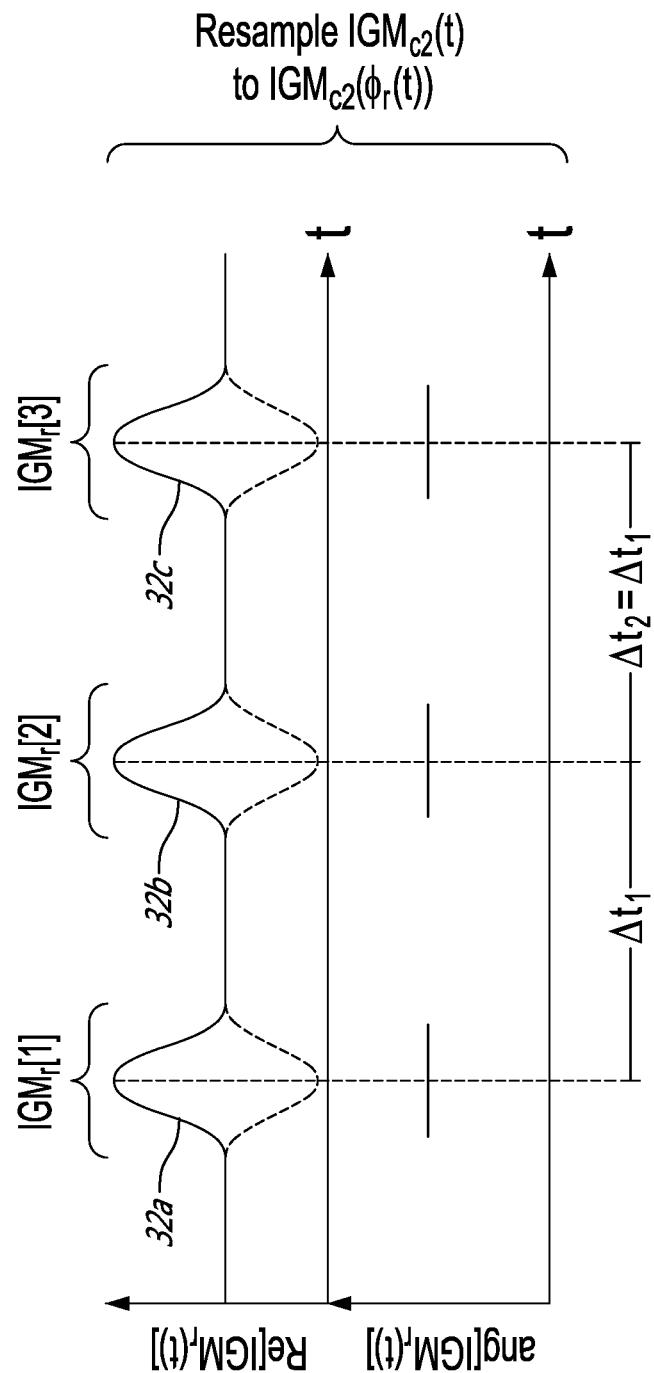

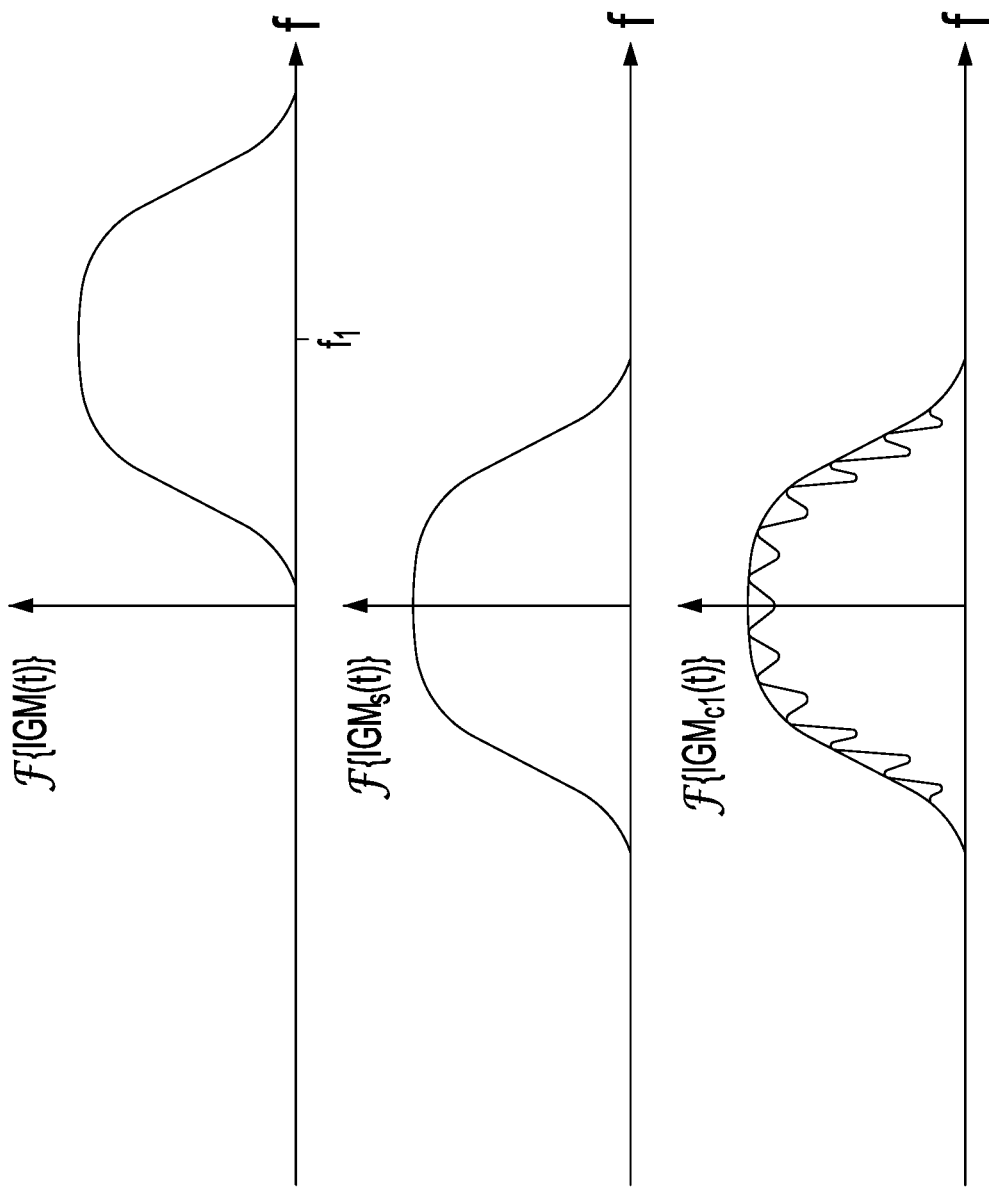

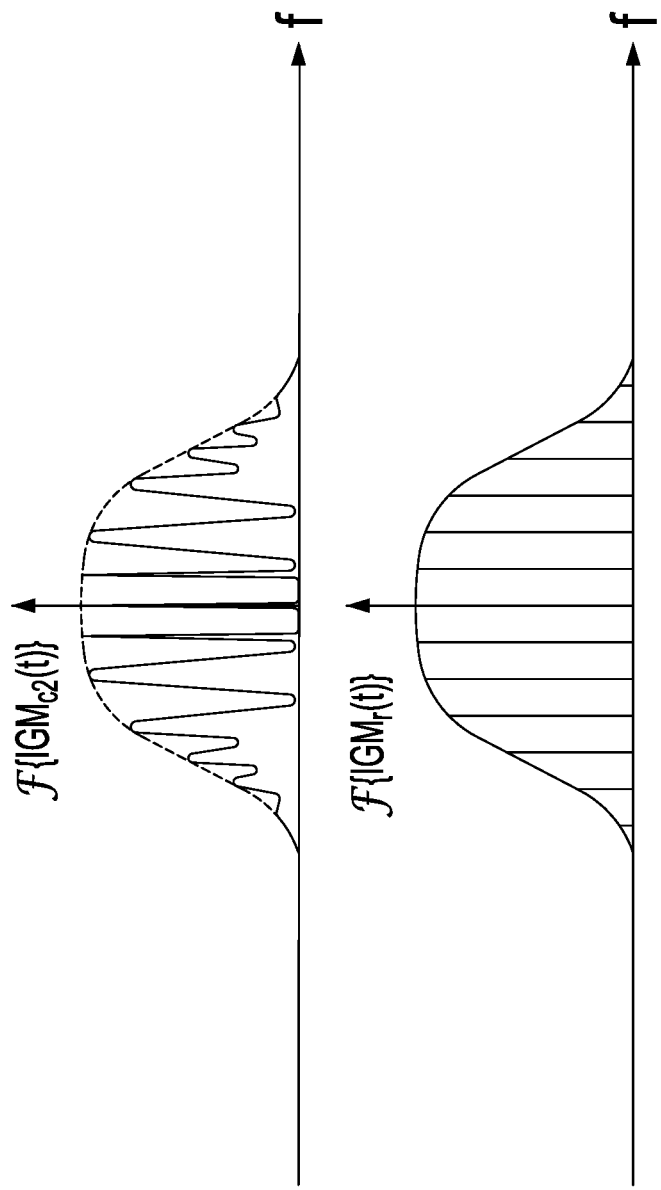

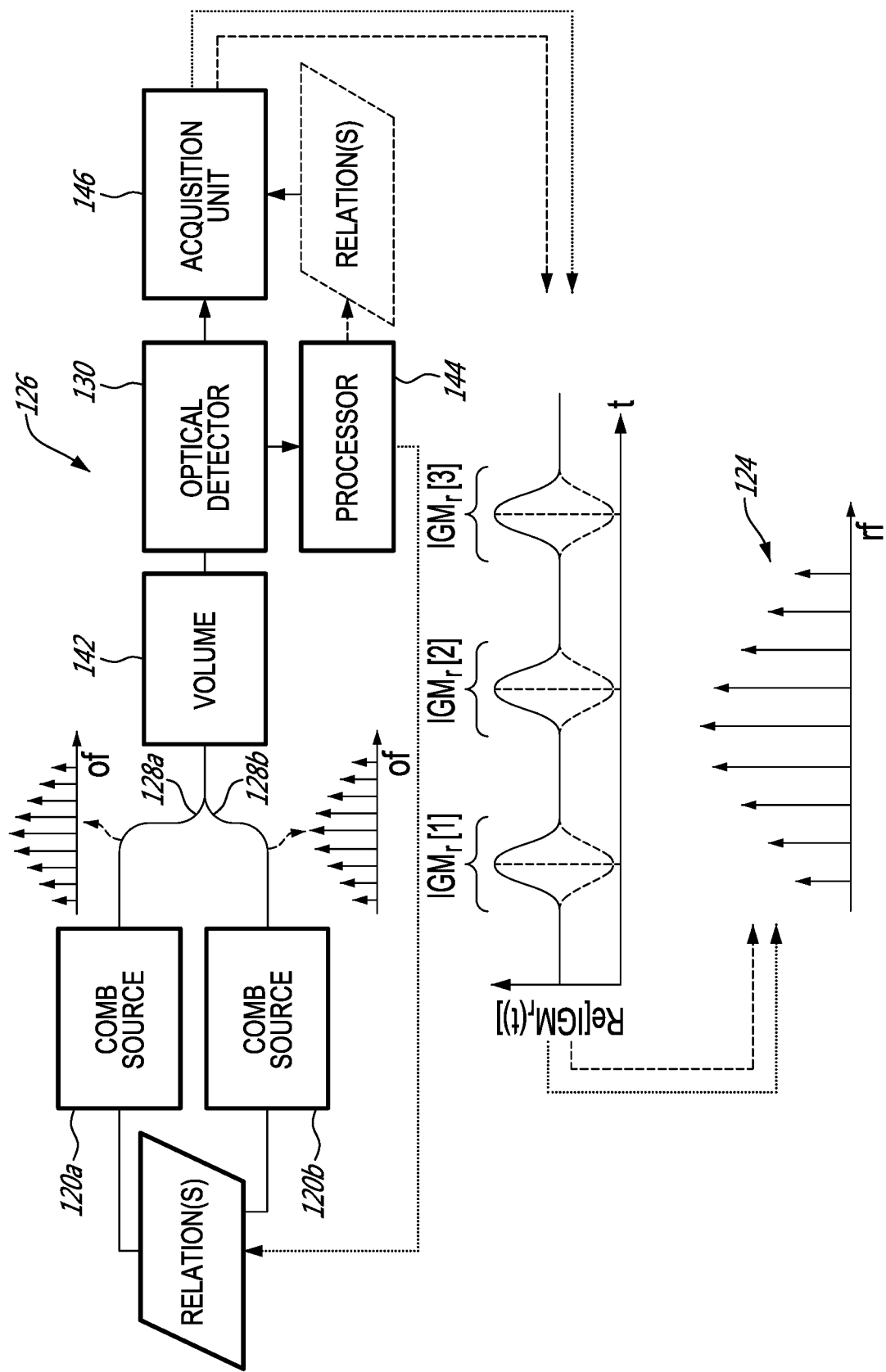

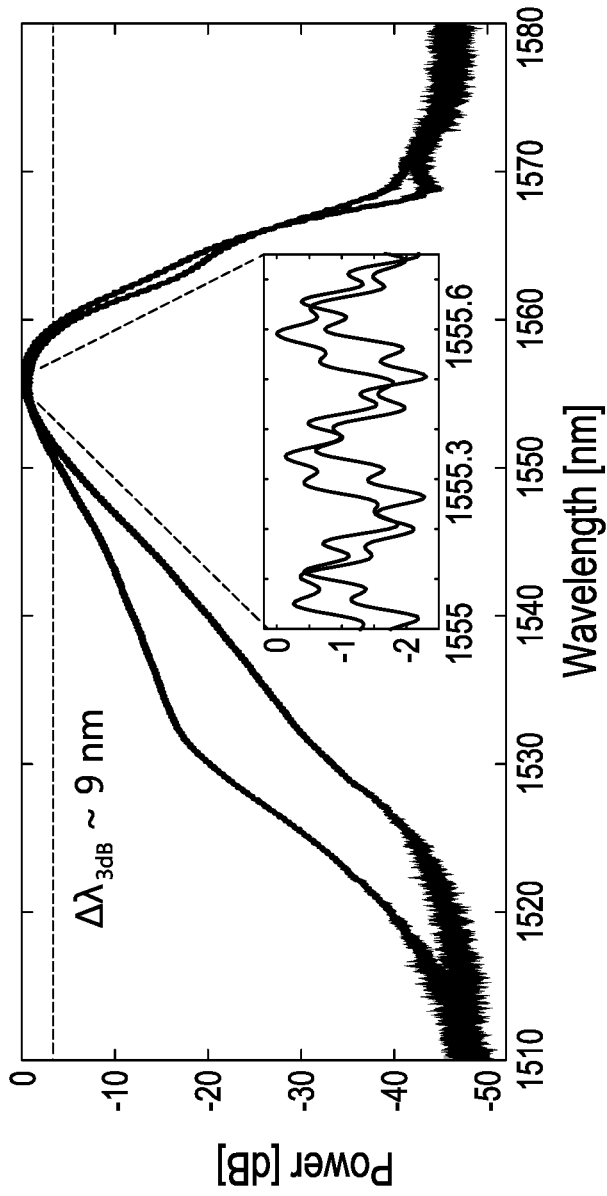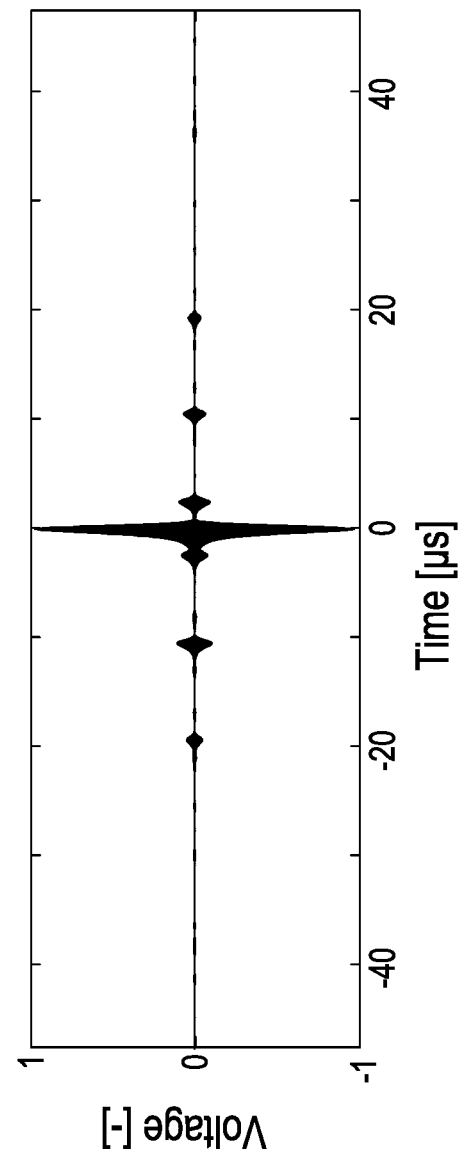
Fig. 17A
Fig. 17B

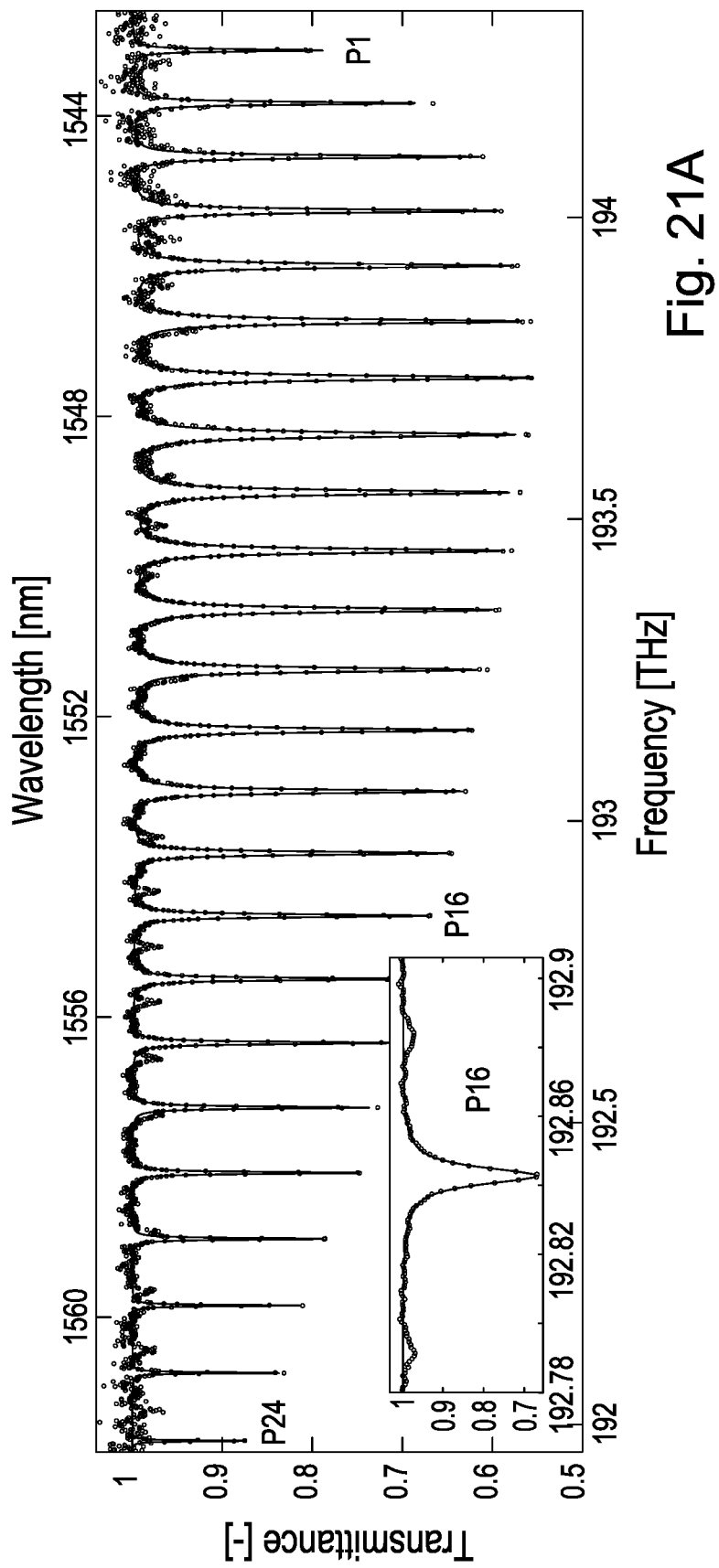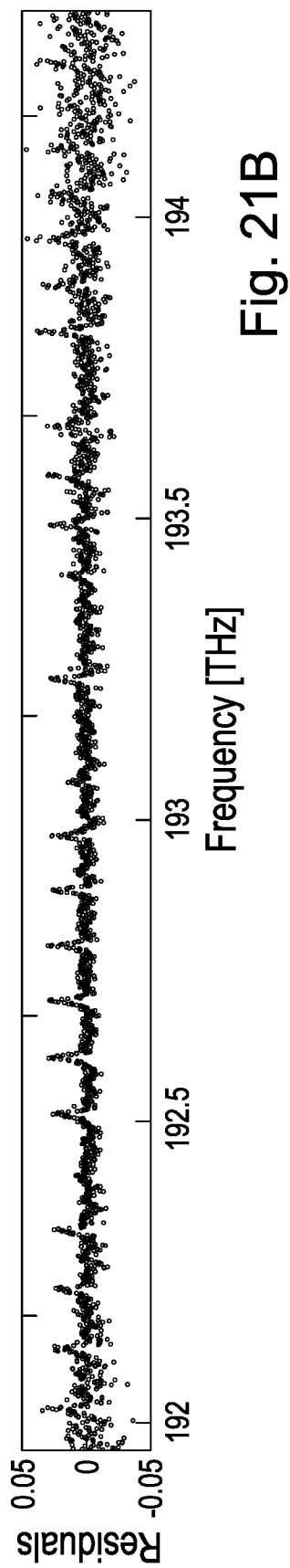
Fig. 21A
Fig. 21B

METHODS FOR PERFORMING DUAL-COMB INTERFEROMETRY USING A FREQUENCY OFFSET RELATION

FIELD

The improvements generally relate to interferometry and more particularly relates to dual-comb interferometry.

BACKGROUND

Dual-comb interferometry used for instance in spectroscopy has attracted a lot of attention recently, as reported in the review article entitled "Dual-comb spectroscopy" authored by Coddington, I., Newbury, N. & Swann, W. and published in *Optica* (2016).

Generally put, a comb source refers to a laser source being configured to emit an optical field with a periodic amplitude pattern having an optical comb spectrum or a frequency comb, i.e. an optical spectrum having a plurality of discrete and equally spaced optical spectral components. The periodic amplitude pattern can take the form of a laser pulse train.

As depicted in FIG. 1A, dual-comb interferometry involves a dual-comb source or two comb sources $10a,10b$ emitting an optical signal 13 including two mutually coherent optical fields $11a,11b$ with slightly detuned repetition rates and respective optical comb spectrums $12a,12b$. A volume 14 can be interrogated by either or both of the optical fields $11a,11b$ as shown by the two possible locations of the volume 14. The two optical fields $11a,11b$ are interfered with one another on an optical detector 15 to generate a beat note, typically referred to as a beating interference signal 16, with spectral components in the radio frequency (rf) domain. The beating interference signal 16 is typically acquisitioned using an acquisition unit 17.

When the two comb sources $10a,10b$ are mutually coherent or referenced to one another, for instance using a phase locking system 18, the beating interference signal 16 exhibits an electrical comb spectrum 19 which can be mapped to an optical comb spectrum of the optical signal in the optical frequency (of) domain. Accordingly, interferometric measurements can be performed on the optical signal via the downsized, and measurable, electrical signal.

The stability of the two comb sources $10a,10b$ relative to one another is required to ensure that the frequency components of the beating interference signal are consistent during the whole time interval of the acquisition by the acquisition unit 17. It is known that even minor repetition rate and/or carrier frequency variations of any of the comb sources $10a,10b$ can change the mapping between the electrical signal and the optical signal, thus limiting the resulting spectral resolution.

There exists a number of techniques to phase-lock or reference two comb sources $10a,10b$ to one another. For instance, an exemplary phase locking system 18 is presented in FIG. 1B. However, as can be understood from FIG. 1B, these techniques typically involve additional hardware, and thus additional costs, which limits the widespread use of dual-comb interferometry in some applications. There thus remains room for improvement.

SUMMARY

As shown in FIG. 2, when two comb sources $20a,20b$ are not phased-locked relative to one another, which are often referred to as "free-running combs", the beating interference signal 22 can have an electrical spectrum 24 with undistinguishable peaks, which rather hinders the spectral resolution of the resulting dual-comb interferometer 26.

It is known that the beating interference signal 22 results from the interference of first and second optical fields $28a,28b$ exhibiting respective optical comb spectrums $21a$, $21b$ with one another on an optical detector 30 and that the beating interference signal 22 has a plurality of successive beating features 32 indicative of the periodicity of the interference between the first optical field $28a$ and the second optical field $28b$.

Although each one of the beating features 32 carries timing and phase information, the remaining portions 34 of the beating interference signal 22 may fail to provide any significant timing and phase information between the first and second optical fields $28a,28b$.

There are described methods which allow the determination of timing and phase information not only at the beating features 32 but also between consecutive beating features 32, without the use of additional hardware. The methods can be performed on the beating interference signal as it is measured or alternatively on dual-comb interferogram data indicative of the beating interference signal stored on a permanent and/or temporary memory. The determined timing and phase information can then be used to provide an electrical comb spectrum with distinguishable peaks that can be used to achieve high-resolution dual-comb interferometry. Examples of dual-comb interferometry includes dual-comb spectroscopy for characterizing a sample, dual-comb optical coherence tomography (OCT), dual-comb ranging such as dual-comb light detection and ranging (LIDAR) for characterizing a distance of an object in a scene or any other suitable dual-comb interferometry application for characterizing a volume (e.g., a sample, an object, a scene, an optical component).

In a first method, a frequency offset relation $\delta f(t)$ can be determined between a reference one of the beating features and any other beating feature. The frequency offset relation $\delta f(t)$ results from a continuous interpolation between a plurality of combinations of relative time differences $\tau k$ and relative frequency offsets $\delta f k$ obtained using ambiguity functions between the reference beating feature and corresponding ones of the other beating features. More specifically, the relative time differences $\tau k$ are indicative of the relative time difference between the reference beating feature and the other ones of the beating features. Similarly, the relative frequency offsets $\delta f k$ are indicative of the relative frequency offsets between a carrier frequency $f1$ of the reference beating feature and a frequency of the other ones of the beating features. In some embodiments, the frequency offset relation $\delta f(t)$ can be used to determine a first phase correction relation $\phi c1(t)$ by integrating the frequency offset relation $\delta f(t)$ over time.

In a second method, a second phase correction relation $\phi c2(t)$ can be determined between a reference one of the beating features and any other beating feature. The second phase correction relation $\phi c2(t)$ results from a continuous interpolation based on phase offset data sets ($\tau k$, $\phi k$) obtained using cross-correlation functions between the reference beating feature and corresponding ones of the other beating features. The relative time differences $\tau k$ are indicative of the relative time difference between a reference one of the beating features and other ones of the beating features. Similarly, the relative phase offsets $\phi k$ are indicative of the relative phase offset between a phase of the reference one of the beating features and a phase of the other ones of the beating features.

In some embodiments, the first and second methods are performed sequentially. In some other embodiments, for instance when the two free-running combs are relatively stable relative to one another, the first method can be omitted.

In accordance with one aspect, there is provided a method for performing dual-comb interferometry using a dual-comb interferometer, the method comprising: emitting first and second optical fields having respective, different repetition rates and respective optical comb spectrums; measuring a dual-comb beating interference signal resulting from the interference of the first and second optical fields with one another on an optical detector, the beating interference signal having a plurality of successive beating features indicative of the periodicity of the interference between the first optical field and the second optical field; calculating, for each of at least two pairs of said beating features, each pair including a reference beating feature, a plurality of magnitude values by performing corresponding ambiguity functions between the corresponding beating features of the pair for a plurality of different combinations of relative time differences $\tau i$ and relative frequency offsets $\delta fi$; determining a frequency offset relation $\delta f(t)$ by performing a continuous interpolation based on combinations of relative time difference $\tau k$ and relative frequency offset $\delta fk$ yielding maximum magnitude values calculated for corresponding pairs of said beating features; and correcting the dual-comb beating interference signal based on the frequency offset relation $\delta f(t)$.

In accordance with another aspect, there is provided a method for performing dual-comb interferometry using a dual-comb interferometer, the method comprising: emitting first and second optical fields having respective, different repetition rates and respective optical comb spectrums; measuring a dual-comb beating interference signal resulting from the interference of the first and second optical fields with one another on an optical detector, the beating interference signal having a plurality of successive beating features indicative of the periodicity of the interference between the first optical field and the second optical field; calculating, for each of at least two pairs of said beating features, each pair including a reference beating feature, a cross-correlation function between the corresponding beating features of the pair for a plurality of different relative time differences $\tau i$; determining a phase correction relation $\phi c(t)$ by performing a continuous interpolation based on phase offset data sets ($\tau k$, $\phi k$) including the relative time differences $\tau k$ yielding maximums of the cross-correlation functions calculated for corresponding pairs of said beating features and phase offsets $\phi k$ associated to respective relative time differences $\tau k$; and correcting the dual-comb beating interference signal based on the phase correction relation $\phi c(t)$.

In accordance with another aspect, there is provided a method for characterizing a volume using dual-comb interferogram data generated by a dual-comb interferometer, the method comprising: using at least a processor, accessing the dual-comb interferogram data, the dual-comb interferogram data including a plurality of beating features; calculating, for each of at least two pairs of said beating features, each pair including a reference beating feature, a plurality of magnitude values by performing corresponding ambiguity functions between the corresponding beating features of the pair for a plurality of different combinations of relative time differences $\tau i$ and relative frequency offsets $\delta fi$; determining a frequency offset relation $\delta f(t)$ by performing a continuous interpolation based on combinations of relative time difference $\tau k$ and relative frequency offset $\delta fk$ yielding maximum magnitude values calculated for corresponding pairs of said beating features; correcting the dual-comb interferogram data based on the frequency offset relation $\delta f(t)$; and analyzing the volume based on the corrected dual-comb interferogram data.

In accordance with another aspect, there is provided a method for characterizing a volume using dual-comb interferogram data generated by a dual-comb interferometer, the method comprising: using at least a processor, accessing the dual-comb interferogram data, the dual-comb interferogram data including a plurality of beating features; calculating, for each of at least two pairs of said beating features, each pair including a reference beating feature, a cross-correlation function between the corresponding beating features of the pair for a plurality of different relative time differences $\tau i$; determining a phase correction relation $\phi c(t)$ by performing a continuous interpolation based on phase offset data sets ($\tau k$, $\phi k$) including the relative time differences $\tau k$ yielding maximums of the cross-correlation functions calculated for corresponding pairs of said beating features and phase offsets $\phi k$ associated to respective relative time differences $\tau k$; correcting the dual-comb interferogram data based on the phase correction relation $\phi c(t)$; and analyzing the volume based on the corrected dual-comb interferogram data.

In accordance with another aspect, there is provided a method for correcting dual-comb interferogram data including a plurality of beating features, the method comprising: accessing the dual-comb interferogram data; calculating a plurality of magnitude values by performing corresponding ambiguity functions between a reference beating feature and one of the beating features for a plurality of different relative time differences $\tau i$ and a plurality of relative frequency offsets $\delta fi$; selecting a combination of relative time difference $\tau k$ and relative frequency offset $\delta fk$ associated to a maximum value among the plurality of magnitude values; performing said steps of calculating and selecting between the reference beating feature and remaining ones of the beating features; determining a frequency offset relation $\delta f(t)$ by performing a continuous interpolation based on the plurality of selected combinations ($\tau k, \delta fk$); and correcting the dual-comb interferogram data based on the frequency offset relation $\delta f(t)$.

In accordance with another aspect, there is provided a method for correcting dual-comb interferogram data including a plurality of beating features, the method comprising: accessing the dual-comb interferogram data; calculating a cross-correlation function between a reference beating feature and one of the beating features for a plurality of different relative time differences $\tau i$; selecting a relative time difference $\tau k$ associated to a maximum of the cross-correlation function and selecting a phase offset $\phi k$ associated to the relative time difference $\tau k$; performing said steps of calculating and determining between the reference beating feature and remaining ones of the beating features; determining phase offset data sets ($\tau k$, $\phi k$) based on the relative time differences $\tau k$ and on the selected phase offsets $\phi k$; determining a phase correction relation $\phi c(t)$ by performing a continuous interpolation based on the phase offset data sets ($\tau k$, $\phi k$); and correcting the dual-comb interferogram data based on the phase correction relation $\phi c(t)$.

In a first exemplary application, the determined relation(s) $\delta f(t)$, $\phi c1(t)$ and/or $\phi c2(t)$ can be used to determine characteristics of a substance by correcting the dual-comb interferogram data and/or the beating interference signal according to the methods described herein, and by determining the characteristics of the substance based on the corrected dual-comb interferogram data and/or the corrected beating interference signal.

In a second exemplary application, the determined relation(s) $\delta f(t)$, $\phi c1(t)$ and/or $\phi c2(t)$ can be used to determine a distance of an object in a scene by correcting the dual-comb interferometry data and/or the beating interference signal according to the methods described herein, and by determining the distance of the object in the scene based on the corrected dual-comb interferogram data and/or the corrected beating interference signal.

The expression "correcting" is used broadly to encompass situations where the correction includes i) the stabilization of the first and second optical fields of the dual-comb interferometer relative to one another based on the determined relation(s) $\delta f(t)$, $\phi c1(t)$ and/or $\phi c2(t)$, ii) the acquisition of an incoming beating interference signal based on the determined relation(s) $\delta f(t)$, $\phi c1(t)$ and/or $\phi c2(t)$, iii) the "real-time" processing of a beating interference signal to provide corrected dual-comb interferogram data using an analogic processor and/or a digital processor such as a field programmable gate array (FPGA) based on the determined relation(s) $\delta f(t)$, $\phi c1(t)$ and/or $\phi c2(t)$ and iv) the post-processing of dual-comb interferogram data using a computer based on the determined relation(s) $\delta f(t)$, $\phi c1(t)$ and/or $\phi c2(t)$.

In this specification, the expression "data" is used to refer to the information which is received from a signal and which is stored in a computer-readable memory. The expression "signal" refers to information which is carried in real-time. However, the information carried in a signal can be, to a certain extent, stored and processed in a temporary memory. Accordingly, the definitions of data and of signal as used herein can overlap within a certain extent.

In this specification, a computer is meant to include one or more processors (referred to as "the processor") and one or more computer-readable memories (referred to as "the memory") having stored thereon program instructions configured to cause the processor to generate one or more outputs based on the processing of one or more inputs.

The inputs may comprise one or more signals or data generated by a dual-comb interferometer, interpolation functions and the like. The outputs may comprise one or more signals or data representative of the relative time differences $\tau k$, relative frequency offsets $\delta fk$ and/or relative phase offsets $\phi k$ and/or the corrected dual comb interferogram data.

The processor may comprise any suitable devices configured to cause a series of steps to be performed analogically or digitally so as to implement the methods described here such that the instructions, when executed, may cause the functions/acts/steps specified in the processing methods described herein to be executed. The processor may comprise, for example, any type of general-purpose microprocessor or microcontroller, a digital signal processing (DSP) processor, a central processing unit (CPU), an integrated circuit, a FPGA, a reconfigurable processor, other suitably programmed or programmable logic circuits, or any combination thereof. The processor can be part of a computer when dual-comb interferogram data are to be processed. However, it will be understood that the processor can be used alone when the beating interference signal is to be processed analogically or digitally.

The memory may comprise any suitable known or other machine readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to device such as, for example, random-access memory (RAM), read-only memory (ROM), compact disc read-only memory (CDROM), electro optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing machine-readable instructions executable by the processor.

Each computer program described herein may be implemented in a high level procedural or object oriented programming or scripting language, or a combination thereof, to communicate with a computer. Alternatively, the programs may be implemented in assembly, machine language or any suitable implementation. The language may be a compiled language, interpreted language or any other suitable language. Computer-executable instructions may be in many forms, including but not limited to program modules, executed by one or more computers or other devices. Generally, program modules include but are not limited to routines, programs, objects, components, data structures, etc., that perform particular tasks or implement particular abstract data types. Typically the functionality of the program modules may be combined or distributed as desired in various embodiments.

Many further features and combinations thereof concerning the present improvements will appear to those skilled in the art following a reading of the instant disclosure.

DESCRIPTION OF THE FIGURES

In the figures,

FIG. 7A is a graph of an example of a frequency offset relation, in accordance with an embodiment;

FIG. 7B is a graph of an example of a first phase correction relation, in accordance with an embodiment;

FIG. 8A is a graph of the real part of an example of a first corrected dual-comb interferogram data, in accordance with an embodiment;

FIG. 8B is a graph of the angular part of the first corrected dual-comb interferogram data of FIG. 8A, in accordance with an embodiment;

FIG. 10A is a graph of the real part of an example of a second corrected dual-comb interferogram data, in accordance with an embodiment;

FIG. 10B is a graph of the angular part of the second corrected dual-comb interferogram data of FIG. 10A, in accordance with an embodiment;

FIG. 12A is a graph of the real part of an example of a fully corrected dual-comb interferogram data, in accordance with an embodiment;

FIG. 12B is a graph of the angular part of the fully corrected dual-comb interferogram data of FIG. 12A, in accordance with an embodiment;

FIGS. 13A-E show graphs of the evolution of the electrical spectrum of the beating interference signal at each step of the method of FIG. 3, in accordance with an embodiment;

FIG. 14 is a schematic view of an example of a dual-comb interferometer configured to perform the method of FIG. 3 in real-time using a processor, in accordance with an embodiment;

FIG. 17A is a graph of a power spectrum of two optical fields exhibiting respective optical comb spectrums, in accordance with an embodiment;

FIG. 17B is a graph of an averaged and corrected one of the beating features, in accordance with an embodiment;

FIG. 21A is a graph of a transmission spectrum of $H^{13}C^{14}N$, in accordance with an embodiment; and FIG. 21B is a graph showing fit residuals of the transmission spectrum of FIG. 21A, in accordance with an embodiment.

DETAILED DESCRIPTION

Figure 1A:
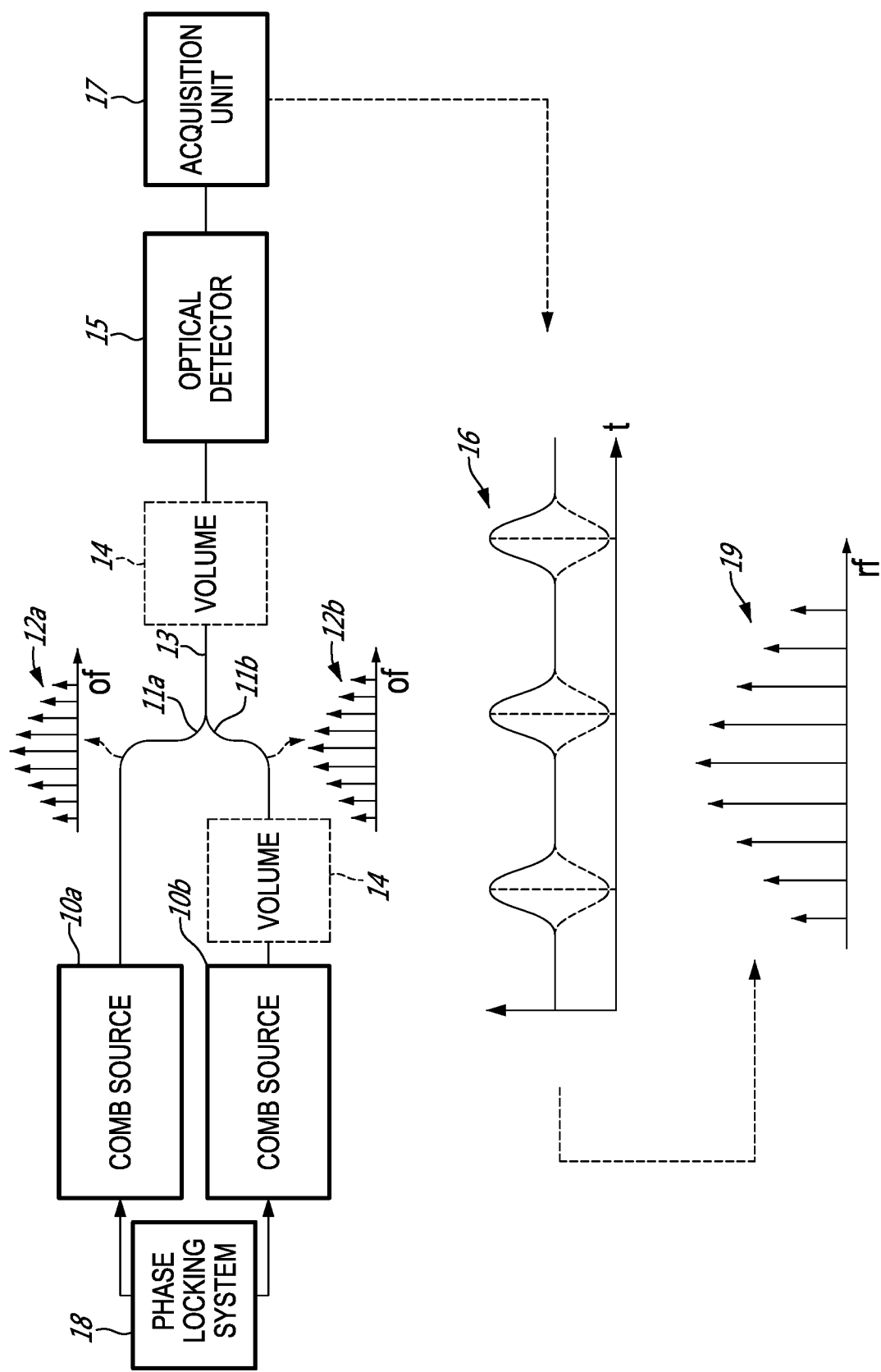
FIG. 1A is a schematic view of an example of a dual-comb interferometer including a phase locking system, in accordance with the prior art.
Figure 1B:
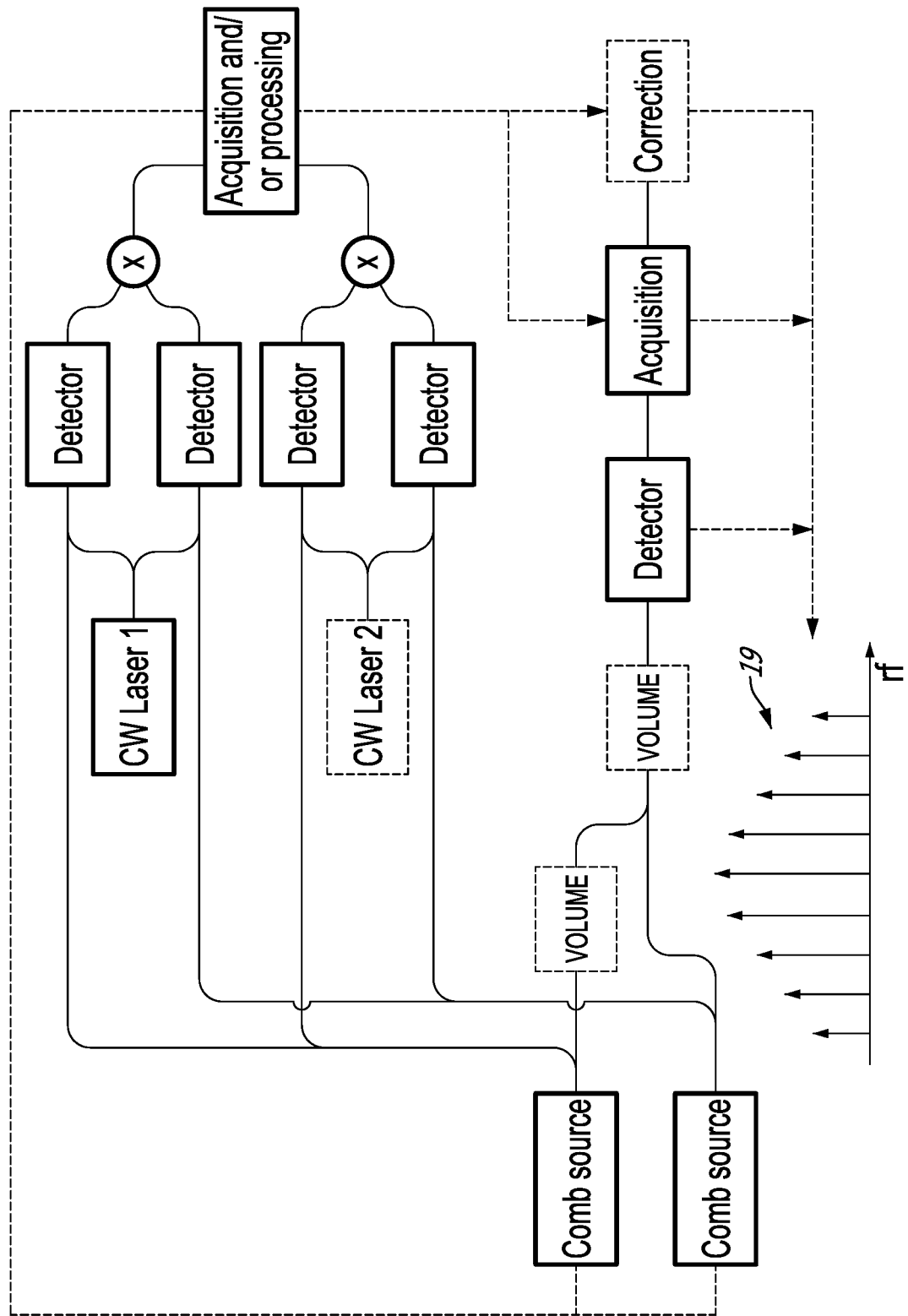
FIG. 1B is a schematic view of an example of a referencing system using continuous wave lasers to track the fluctuations of a dual comb interferometer to i) phase stabilise the combs, ii) adaptively adjust the acquisition of the interference pattern, or iii) to post correct an acquired interference pattern.
Figure 2:
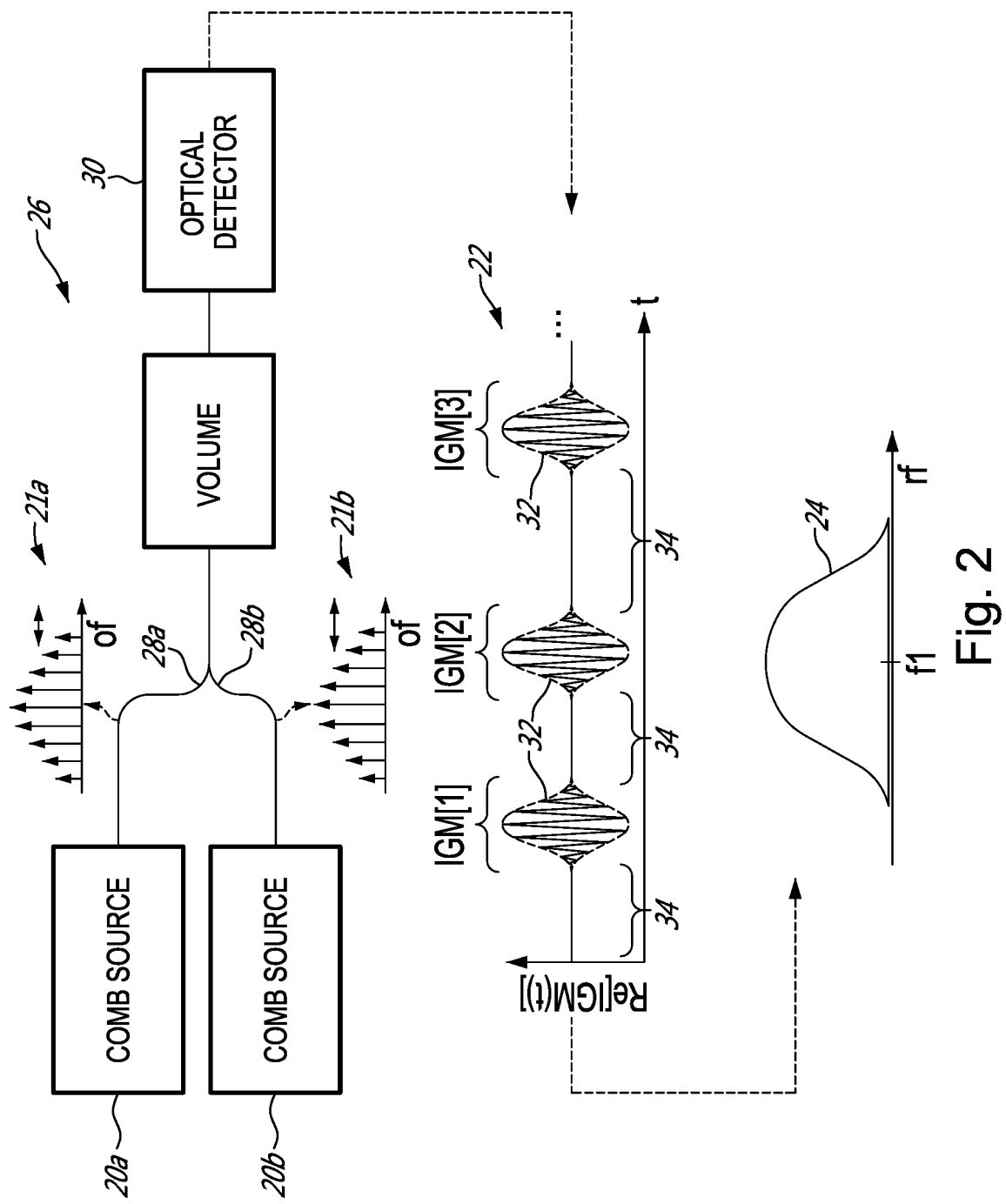
FIG. 2 is a schematic view of an example of a dual-comb interferometer.
Figure 3:
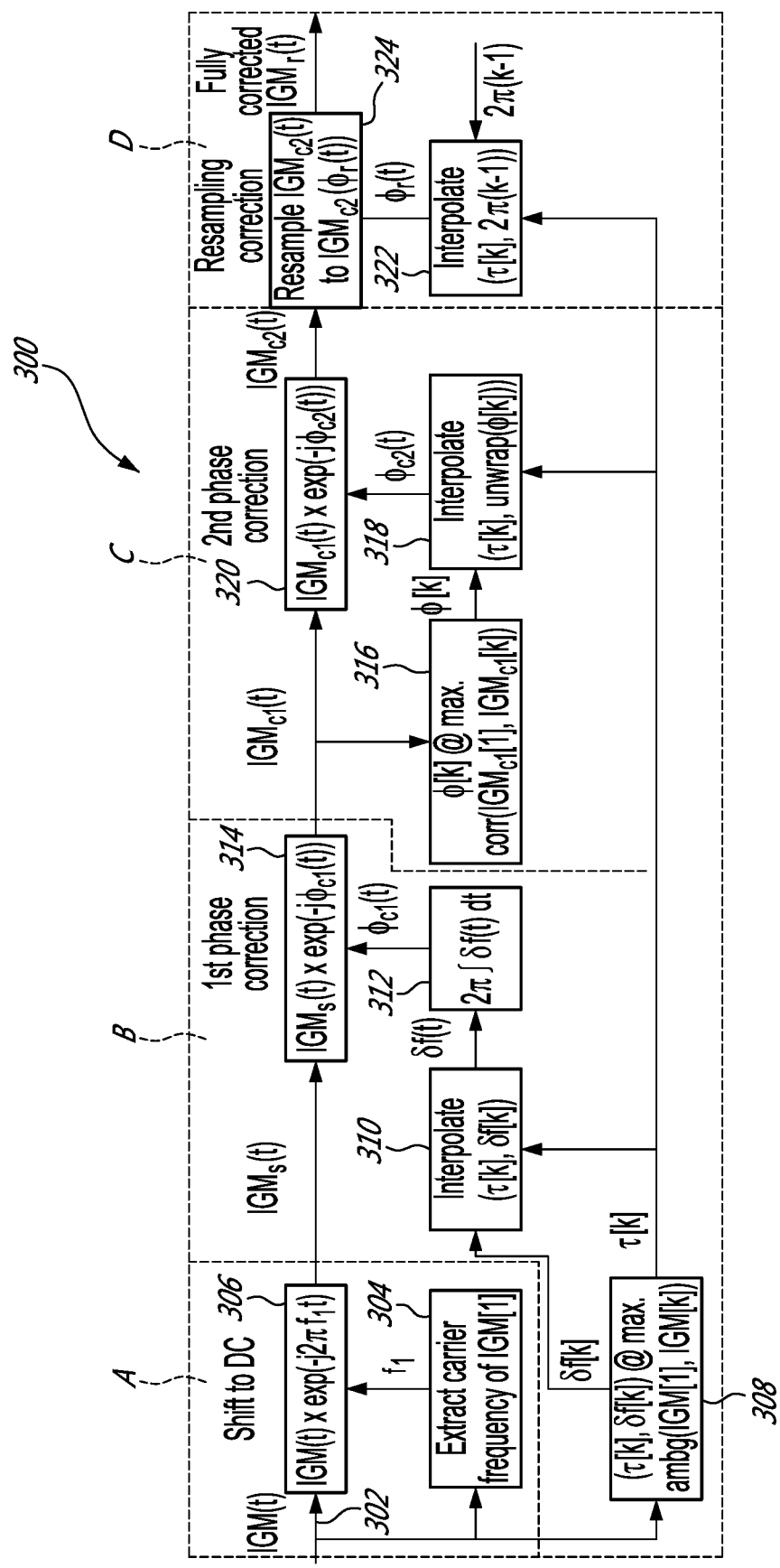
FIG. 3 is a flowchart of a method for correcting dual-comb interferogram data, in accordance with an embodiment.

FIG. 3 shows an example flowchart of a method 300 for correcting dual-comb interferogram data IGM(t) using a computer including a processor and a computer-readable memory. Although, it will be understood that the method 300 can also be performed using a processor in "real-time". This example will be described with reference to the dual-comb interferometer 26 shown in FIG. 2. As can be understood, the dual-comb interferogram data IGM(t) is produced by the optical detector 30 due to the interference of the two optical fields 28a,28b having slightly detuned repetition rates.

As depicted, the exemplary method 300 includes a series of steps which are grouped into a divided into four groups. For instance, the four groups includes a first group A associated with a carrier frequency removal, a second group B associated with a first phase correction, a third group B associated with a second phase correction and a fourth group D associated with resampling. The four groups A-D will be described sequentially in the order presented the method 300. However, it will appear to the skilled reader that the order may differ or that some steps or groups of steps may be omitted in some other embodiments.

For ease of reading, the flowchart of FIG. 3 will be described with reference to other figures which illustrate the dual-comb interferogram data IGM(t) as it is processed step by step.

Group A begins at step 302 where the computer accesses the dual-comb interferogram data IGM(t). In some embodiments, the dual-comb interferogram data IGM(t) are stored on a computer-readable memory of the computer or, alternatively, stored on a remote computer and accessible via a network.

Figure 4:
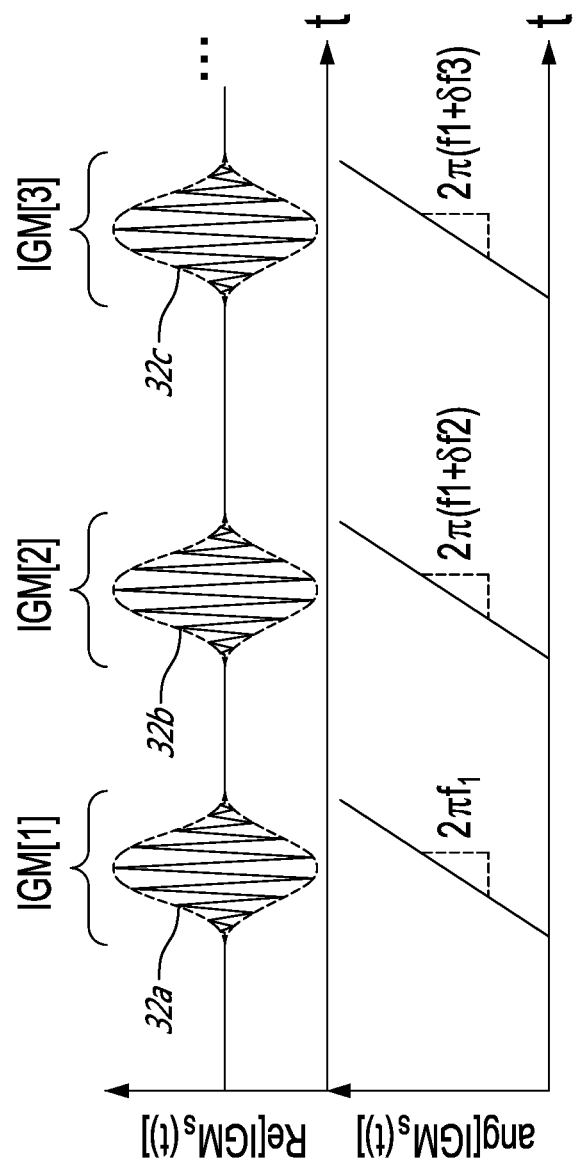
FIG. 4A is a graph of the real part of an example of a beating interference signal, in accordance with an embodiment.
FIG. 4B is a graph of the angular part of the beating interference signal of FIG. 4A.

Since the dual-comb interferogram data IGM(t) can be a complex function, it can be represented as Re[IGM(t)]+j*Im[IGM(t)] or as abs(IGM(t)*exp(j*ang[IGM(t)])). Arbitrarily, FIG. 4A shows the real part of the dual-comb interferogram data IGM(t), i.e. Re[IGM(t)], whereas FIG. 4B shows the angular part of the dual-comb interferogram data IGM(t), i.e. ang[IGM(t)].

As shown, the dual-comb interferogram data IGM(t) has a plurality of successive beating features, e.g., first, second and third beating features 32a, 32b and 32b, produced when the optical field of the first comb source 28a interferes with the optical field of the second comb source 28b on the optical detector 30. Since the first and second optical fields 28a,28b are not phased-locked relative to one another in this example, the repetition rates and the carrier frequency offsets of each of the first and second optical fields 28a,28b can vary over time which can cause a variation in the time difference between two consecutive beating features and in the carrier frequency of each of the beating features. For instance, the first, second and third beating features 32a, 32b and 32b shown are not equally spaced in time from one another nor does they share a common carrier frequency. More specifically, in this example, the carrier frequency of each of the first, second and third beating features 32a, 32b and 32b, e.g., f1, f1+δf2 and f1+δf3, can be determined from its respective slope in the angular part of the dual-comb interferogram data ang[IGM(t)], as shown in FIG. 4B.

At steps 304 and 306, the computer determines a carrier frequency f1 of a reference one of the beating features and removes frequency components associated to the carrier frequency f1 in the dual-comb interferogram data to obtain carrier-free interferogram data IGMs(t). More specifically, the computer computes:

$$IGM_S(t)=IGM(t)\times e^{-j2\pi f_1 t}.$$

In this example, the first beating feature 32a is used as the reference beating feature. However, it will be understood that any other one of the beating features can be used as the reference beating feature. In some embodiments, data concerning the reference beating feature is not part of the dual-comb interferogram data but rather stored separately.

Figure 5:
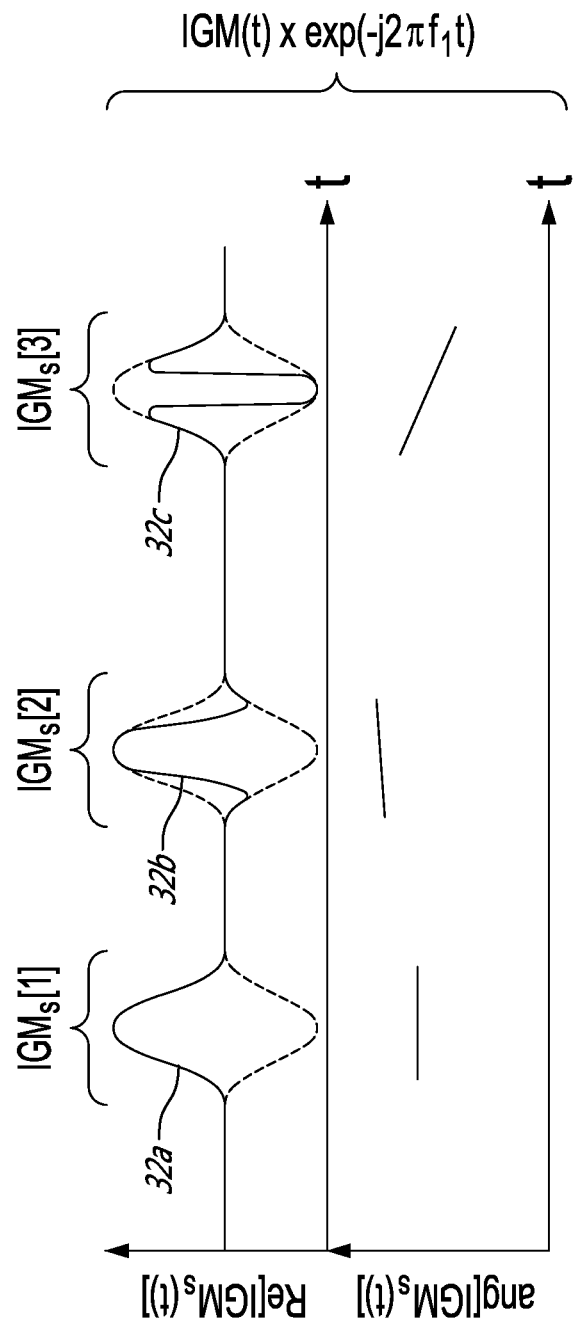
FIG. 5A is a graph of the real part of an example of a carrier-free beating interference signal, in accordance with an embodiment.
FIG. 5B is a graph of the angular part of the carrier-free beating interference signal of FIG. 5A, in accordance with an embodiment.

FIG. 5A shows the real part of the carrier-free interferogram data IGMs(t) whereas FIG. 5B shows the angle part of the carrier-free interferogram data IGMs(t). It can be seen that the reference beating feature 32a is now free from spectral components associated with the carrier frequency f1. However, the other beating features 32b and 32c are not necessarily corrected since their respective carrier frequencies differ from the carrier frequency f1 of the reference beating feature.

Group B begins at step 308 where the computer calculates a plurality of magnitude values $|X_{1,2}(\tau_i,\delta f_i)|$ by performing corresponding ambiguity functions between the reference beating feature 32a and another one of the beating features, e.g., the second beating feature 32b, for a plurality of different relative time differences τi and a plurality of relative frequency offsets δfi. More specifically, the computer computes:

$$X_{1,2}(\tau_i,\delta f_i)=\int_{-\infty}^{\infty} A_1(t)A^*_2(t+\tau_i)\exp(i2\pi\delta f_i t)dt.$$

wherein $A_1(t)$ is the waveform of the reference beating feature 32a, $A_2(t)$ is the waveform of the second beating feature 32b, * denotes the complex conjugation and the relative frequency offset δfi is an offset relative to the carrier frequency f1 of the reference beating feature 32a.

Figure 6:
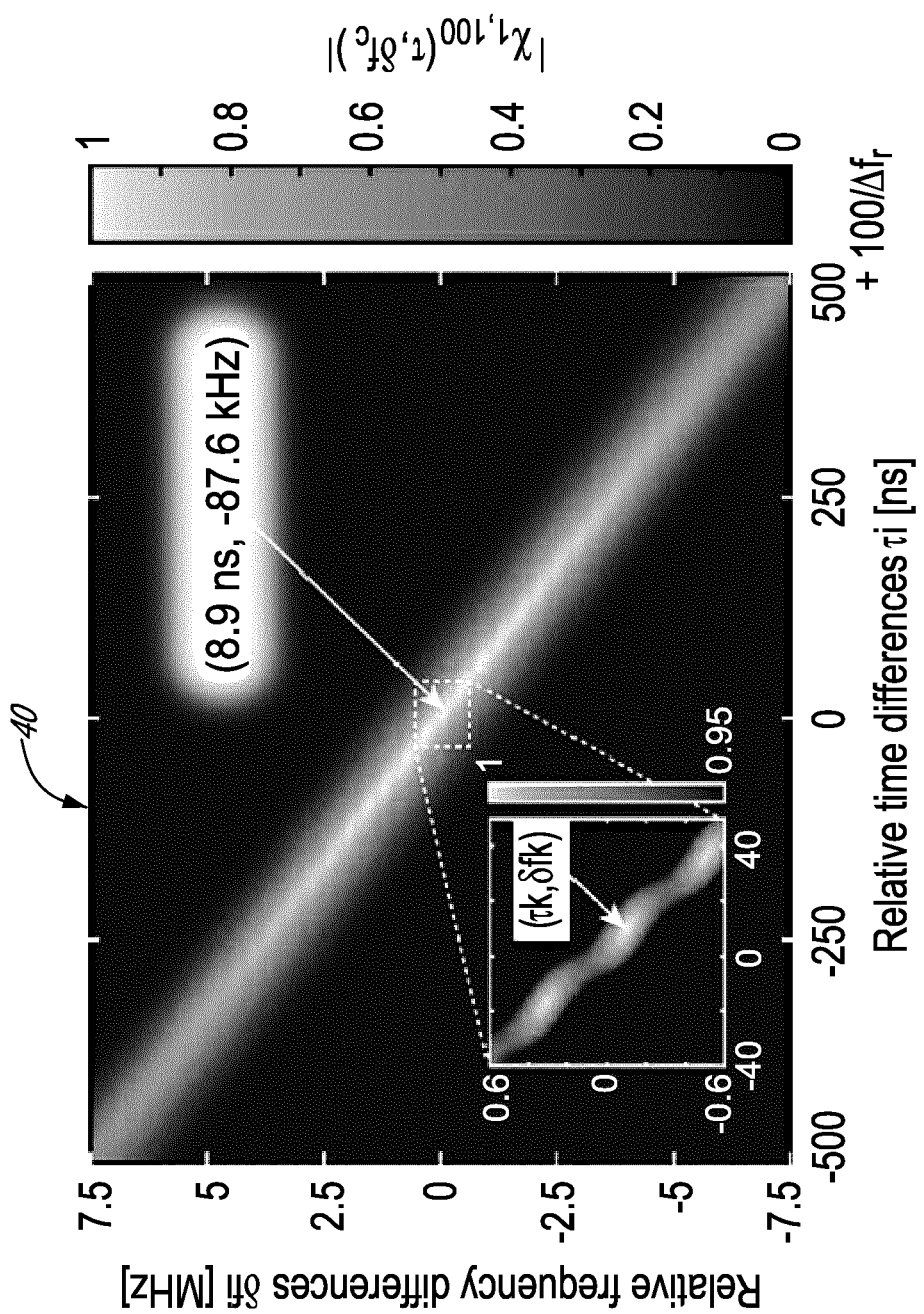
FIG. 6 is a graph showing an example of an ambiguity map including a plurality of magnitude values obtained by performing corresponding ambiguity functions between a reference beating feature and another beating feature, in accordance with an embodiment.

It is noted that the ambiguity function is closely related to the cross-correlation function, but besides revealing the relative time difference τ between two similar waveforms, it also reveals their frequency offset $\delta f_i$. More specifically, the ambiguity function gives a measure of the similarity of two waveforms, $A_1(t)$ and $A_2(t)$, as a function of τi and δfi. It is known that an uncompensated frequency shift can modify the apparent time difference between waveforms, especially in the presence of chirp. Hence, it is important that the relative time difference τk and relative frequency offset δfk are retrieved simultaneously from the point of maximum similarity on an ambiguity map, that is where $|X_{1,2}(\tau_i, \delta f_i)|$ is maximum. FIG. 6 shows exemplary magnitude values $|X_{1,2}(\tau_i, \delta f_i)|$ plotted in an ambiguity map 40 calculated between the reference beating feature 32a and another beating feature.

Still at step 308, the computer selects a combination of relative time difference τk and relative frequency offset δfk associated to a maximum value among the plurality of magnitude values. In the ambiguity map 40, the combination (8.9 ns, −87.6 kHz) yields a maximum value, it is thus the selected combination. It will be understood that the ambiguity map 40 needs not to be plotted by the computer, FIG. 6 is shown only to ease understanding.

Step 308 is performed, e.g., repeated, between the reference beating feature 32a and remaining ones of the beating features, e.g., the third beating feature 32c, to yield a plurality of selected combinations (τk,δfk). For instance, FIG. 7A shows examples of selected combinations (τk,δfk) associated with the first, second and third beating features 32a, 32b and 32c. As can be understood, since the first beating feature 32a is the reference beating feature in this example, the selected combinations (τ1, δf1) associated with the first beating feature 32a corresponds to (0,0), as the first beating feature 32a has a zero time difference with itself and the first beating feature 32a has a zero frequency offset with itself. As shown, the second and third beating features 32b and 32c have a respective one of combinations (τ2,δf2) and (τ3,δf3).

At step 310, the computer determines a frequency offset relation δf(t) by performing a continuous interpolation based on the plurality of selected combinations (τk,δfk).

As exemplified in the following paragraphs, the frequency offset relation δf(t) can be outputted by the computer as it can be used to provide an electrical comb spectrum with distinguishable peaks (such as shown in FIG. 13C). More specifically, at step 312, the computer determines a first phase correction relation $\phi c1(t)$ by integrating the frequency offset relation δf(t) over time. An example of the first phase correction relation $\phi c1(t)$ is shown in FIG. 7B.

At step 314, the computer corrects the carrier-free interferogram data IMGs(t) by applying the first phase correction relation $\phi c1(t)$ to the carrier-free interferogram data IMGs(t) provide a first corrected interferogram data IGMc1(t). More specifically, the computer computes:

$$IGM_{c1}(t)=IGM_S(t)\times e^{-j\phi c1(t)}.$$

FIG. 8A shows the real part of the first corrected interferogram data IGMc1(t) whereas FIG. 8B shows the angle part of the first corrected interferogram data IGMc1(t). It can be seen that the second and third beating feature 32b and 32c now have constant, but different phases.

Group C begins at step 316 where the computer calculates a cross-correlation function between the reference feature and any other beating feature for a plurality of different time differences τi. More specifically, the computer computes:

$$(A_1^* A_2)(\tau_i)=\int_{-\infty}^{\infty} A^*_1(t)A_2(t+\tau_i)dt.$$

wherein $A_1(t)$ is the waveform of the reference beating feature 32a, $A_2(t)$ is the waveform of the other beating feature, e.g., the second beating feature 32b, and * denotes the complex conjugation.

Still at step 316, the computer selects a time difference τk associated to a maximum of the cross-correlation function and selects a phase offset φk associated to the time difference τk.

Figure 9A:
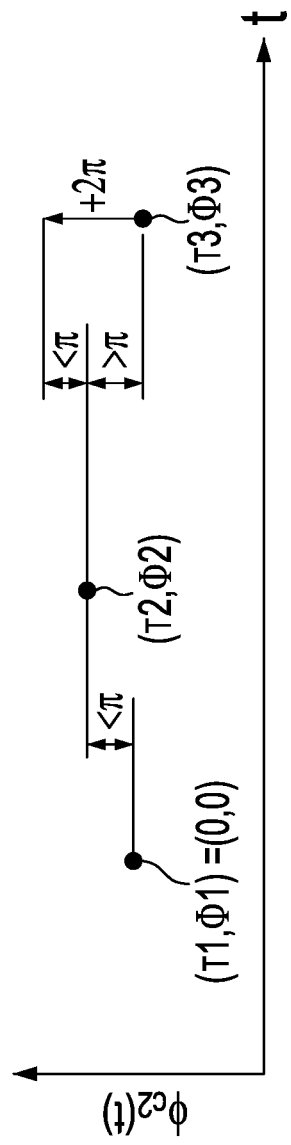
FIG. 9A is a graph showing phase offset data sets, in accordance with an embodiment.

The step 316 is performed between the reference beating feature 32a and remaining ones of the beating features, e.g., the third beating feature 32c, to determine a plurality of phase offset data sets (τk, φk) based on the relative time differences τk and on the selected phase offsets φk. FIG. 9A shows a plot of the phase offset data sets (τ1, φ1), (τ2, φ2) and (τ3, φ3). It is noted that the relative time differences τk can be the ones obtained from the calculations performed in step 308 or in step 316.

Figure 9B:
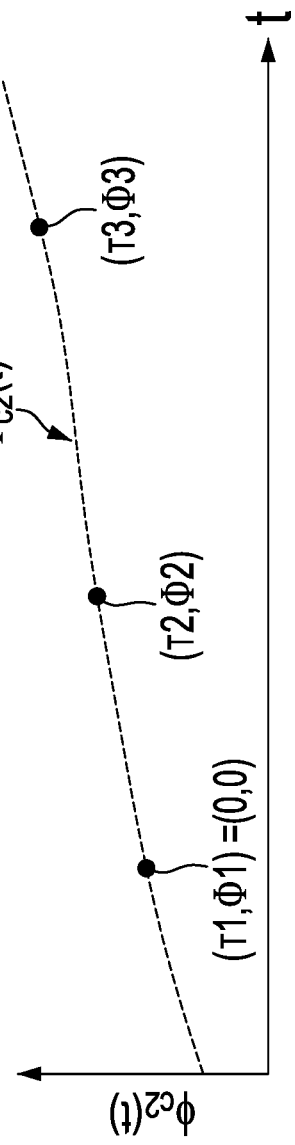
FIG. 9B is a graph showing unwrapped ones of the phase offset data sets of FIG. 9A, in accordance with an embodiment.

At step 318, the computer unwraps the phase offset data sets (τk, φk) by adding an integer multiple of 2π to at least one of the phase offsets φk of the phase offset data sets (τk, φk) in a manner that consecutive phase offsets φk and φk+1 are within −π and +π from one another. The integer multiple p of 2π can include −4π, −2π, 0, +2π, +4π and so forth. In some embodiments, the integer multiple of 2π to add to one, more or all of the phase offsets φk can be 0, in which case this step can be omitted. As shown in FIG. 9B, the phase offset φ2 is comprised within −π and -+π from the phase offset φ1. However, since the phase offset φ3 is not comprised within −π and +π from the phase offset ϕ2, the computer adds an integer multiple of 2π such that the phase offsets ϕ1 and ϕ2 are comprised within −π and +π from one another.

Once the phase offsets of the phase offset data sets (τk, ϕk) are unwrapped, the computer performs a continuous interpolation of the unwrapped phase offset data sets (τk, ϕk) to provide a second phase correction relation ϕc2(t).

At step 320, the computer corrects the first corrected interferogram data IMGc1(t) by applying the second phase correction relation ϕc2(t) to the first corrected interferogram data IMGc1(t) to provide second corrected interferogram data IGMc2(t), an example of which is shown in FIGS. 10A-B. More specifically, the computer computes:

$$IGM_{c2}(t) = IGM_{c1}(t) \times e^{-j\phi c2(t)}.$$

FIG. 10A shows the real part of the second corrected interferogram data IGMc2(t) whereas FIG. 10B shows the angle part of the second corrected interferogram data IGMc2(t). It can be seen that the first, second and third beating feature 32a, 32b and 32c now have constant phases. However, the first, second and third beating features 32a, 32b and 32c are still irregularly spaced in time relative to one another.

It was found advantageous to determine the phase offset data sets (τk, ϕk) based on the calculations of the cross-correlation functions such as presented at step 316. However, in some other embodiments, the phase offset data sets (τk, ϕk) used to determine the second phase correction relation ϕc2(t) can be based on the calculations of the ambiguity functions as presented at step 308. Indeed, because the calculations of the ambiguity functions yield complex numbers, the phase offset data sets (τk, ϕk) can be determined based on the results of the calculations of the ambiguity functions only. More specifically, in these other embodiments, instead of performing the steps of group C, the second phase correction relation ϕc2(t) can be determined by performing a continuous interpolation based on phase offset data sets (τk, ϕk) including i) relative time differences τk of the combinations of relative time difference τk and relative frequency offset δfk yielding maximum magnitude values calculated for corresponding pairs of the beating features (as determined at step 308 of group B) and ii) phase offsets ϕk associated to respective relative time differences τk based on the calculated ambiguity functions. In these embodiments, the relative frequency offset δfk of the beating features may be taken into consideration when determining the phase offset data sets (τk, ϕk).

Figure 11:
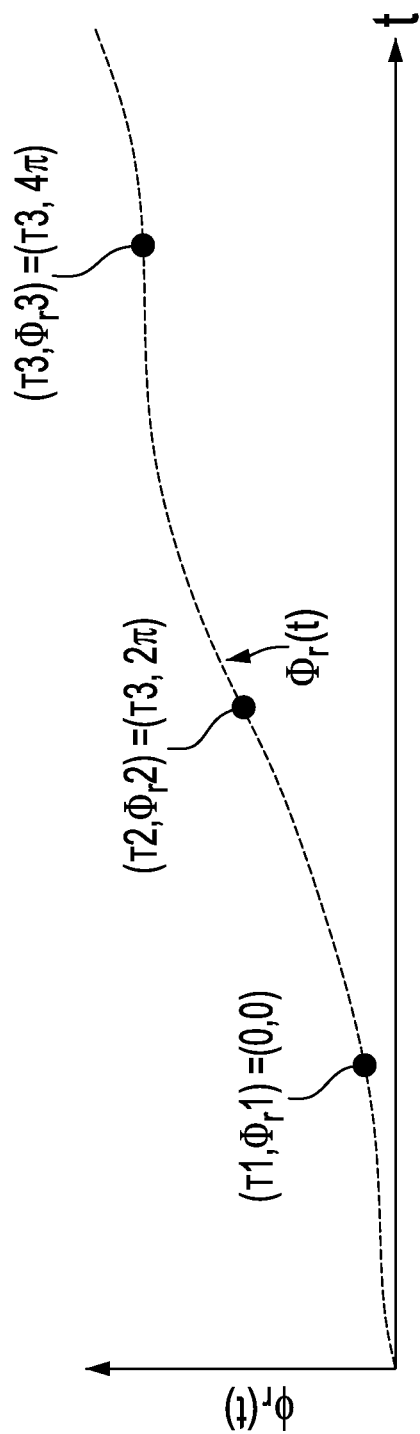
FIG. 11 is a graph of an example of a resampling phase relation, in accordance with an embodiment.

Group D begins at step 322 where the computer determines resampling phase offset data sets (τk, ϕr) by associating consecutive multiples of 2π to consecutive relative time differences τk. For instance, as shown in FIG. 11, the resampling phase offset data set associated with the reference beating feature corresponds to (0,0) and the resampling phase offset data set associated with the kth beating feature corresponds to (τk,2π(k−1)).

Accordingly, the resampling phase offset data set associated with the second and third beating features corresponds to a respective one of (τ2,2π) and (τ3,4π).

Still at step 322, the computer determines a resampling phase relation ϕr(t) by performing a continuous interpolation based on the resampling phase offset data sets (τk, ϕr).

At step 324, the computer resamples the second corrected interferogram data IMGc2(t) based on the resampling phase relation δr(t). More specifically, the computer resamples the second corrected interferogram data IGMc2(t) to IMGc2(ϕr(t)) to provide fully corrected interferogram data IMGr(r), an example of which is shown in FIGS. 12A-B.

As shown in FIGS. 12A-B, each of the beating features 32a, 32b and 32c of the fully corrected interferogram data IMGr(r) are equally spaced in time form one another and are have a common phase or are "phased-locked" relative to one another.

FIGS. 13A-E shows the electrical spectrum associated with the dual-comb interferogram data as it is processed by the method shown in method 300. More specifically, FIG. 13A shows the electrical spectrum of the dual-comb interferogram data IGM(t). As it can be understood, the electrical spectrum is not optimal for dual-comb interferometry purposes since it is not mode-resolved.

FIG. 13B shows the electrical spectrum of the carrier-free interferogram data IGMs(t). As can be seen, the removal of the frequency components associated with the carrier frequency f1 is equivalent to shifting the electrical spectrum of FIG. 13A towards direct current (DC), i.e. around f=0. In some embodiments, the step of removing the frequency components associated with the carrier frequency f1 can be omitted, although this step is desirable because it can simplify any subsequent determinations.

FIG. 13C shows the electrical spectrum of the first corrected interferogram data IGMc1(t), it is therefore understood that application of the first phase correction relation ϕc1(t) tends to reveal at least some spectral modes.

FIG. 13D shows the electrical spectrum of the second corrected interferogram data IGMc2(t). As depicted, the electrical spectrum has spectral modes which are even more defined than the one of the electrical spectrum of FIG. 13C.

Finally, FIG. 13E shows the electrical comb spectrum of the fully corrected and resampled interferogram data IGMr(t). It can be readily understood that the electrical comb spectrum of FIG. 13E is mode-resolved to a certain extent which improves dual-comb interferometry. Indeed, amplitudes of some spectral components of the electrical comb spectrum can be mapped to the spectral components of the optical comb spectrum of the first and/or second optical fields 28a,28b.

In some cases, the first and second optical fields 28a,28b can be said to be stable relative to one another when they are stable over a period of time corresponding to the period of time between two beating features, i.e. 1/Δf, wherein Δf is the difference between the respective, different repetition rates of the first and second optical fields 28a,28b. In these cases, the electrical spectrum of the dual-comb interferogram data can be similar to the electrical spectrum shown in FIG. 13C or in FIG. 13D directly after performing the steps of group A. Accordingly, in these cases, the steps 308-314 of group B can be omitted. Again, in these cases, only the steps of the first, third and fourth groups A, C and D can be performed on the dual-comb interferogram data in order to provide an electrical comb spectrum such as the one shown in FIG. 13E. One way of determining that the first and second optical fields 28a,28b are stable relative to one another is to verify that the phase difference between two subsequent beating features extracted through cross-correlation (steps of group C) is always smaller than π. In other words, ϕ[k]−ϕ[k−1]<π.

In some cases, the first and second optical fields 28a,28b are less stable to one another due to some strong low-frequency instabilities that are slower than the beating feature update rate (<Δfr/2); these low-frequency instabilities would otherwise cause the phase difference φ[k]−φ[k−1] to be greater than u when using solely the steps from groups A, C and D (thus skipping steps of group B). In these cases, the steps of group B can be advantageously performed.

FIG. 14 shows an example of a dual-comb interferometer 126, in accordance with an embodiment. As depicted, in this example, the dual-comb interferometer 126 has two comb sources 120a,120b configured to emit first and second optical fields 128a,128b having respective, different repetition rates. As shown in this embodiment, the first and second optical fields 128a,128b are propagated across a volume 142 and then towards an optical detector 130. The optical detector 130 can be provided in the form of a photodiode, an avalanche photodiode or any other suitable optical detector. The optical detector 130 generates a beating interference signal as the first and second optical fields 128a,128b interfere with one another on the optical detector 130. An acquisition unit 146 is provided to acquisition the beating interference signal generated by the optical detector 130.

In a first embodiment, as shown in dashed lines in FIG. 14, the relations(s) $\delta f(t)$, $\phi c1(t)$ or $\phi c2(t)$ determined by the processor 144 is(are) communicated to the acquisition unit 146 which acquisition the beating interference signal incoming from the optical detector 130 based on the determined relation(s) and store it into the form of corrected dual-comb interferogram data. More specifically, the acquisition unit 146 acquisitions the beating interference signal generated by the optical detector 130 based timing and phase information provided by any one of the relations(s) $\delta f(t)$, $\phi c1(t)$ or $\phi c2(t)$ previously determined by the processor 144. In this embodiment, the output of the acquisition unit 146 can be similar to the fully corrected interferogram data IGMr(t) and can exhibit an electrical comb spectrum 124.

In a second embodiment, as shown in dotted lines in FIG. 14, the relations(s) $\delta f(t)$, $\phi c1(t)$ or $\phi c2(t)$ determined by the processor 144 is(are) communicated to the two comb sources 120a,120b so as to stabilize the first and second optical fields 128a,128b with one another. Similarly, in this embodiment, the data acquisitioned by the acquisition unit 146 can be similar to the fully corrected interferogram data IGMr(t) and can exhibit the electrical comb spectrum 124.

Figure 15:
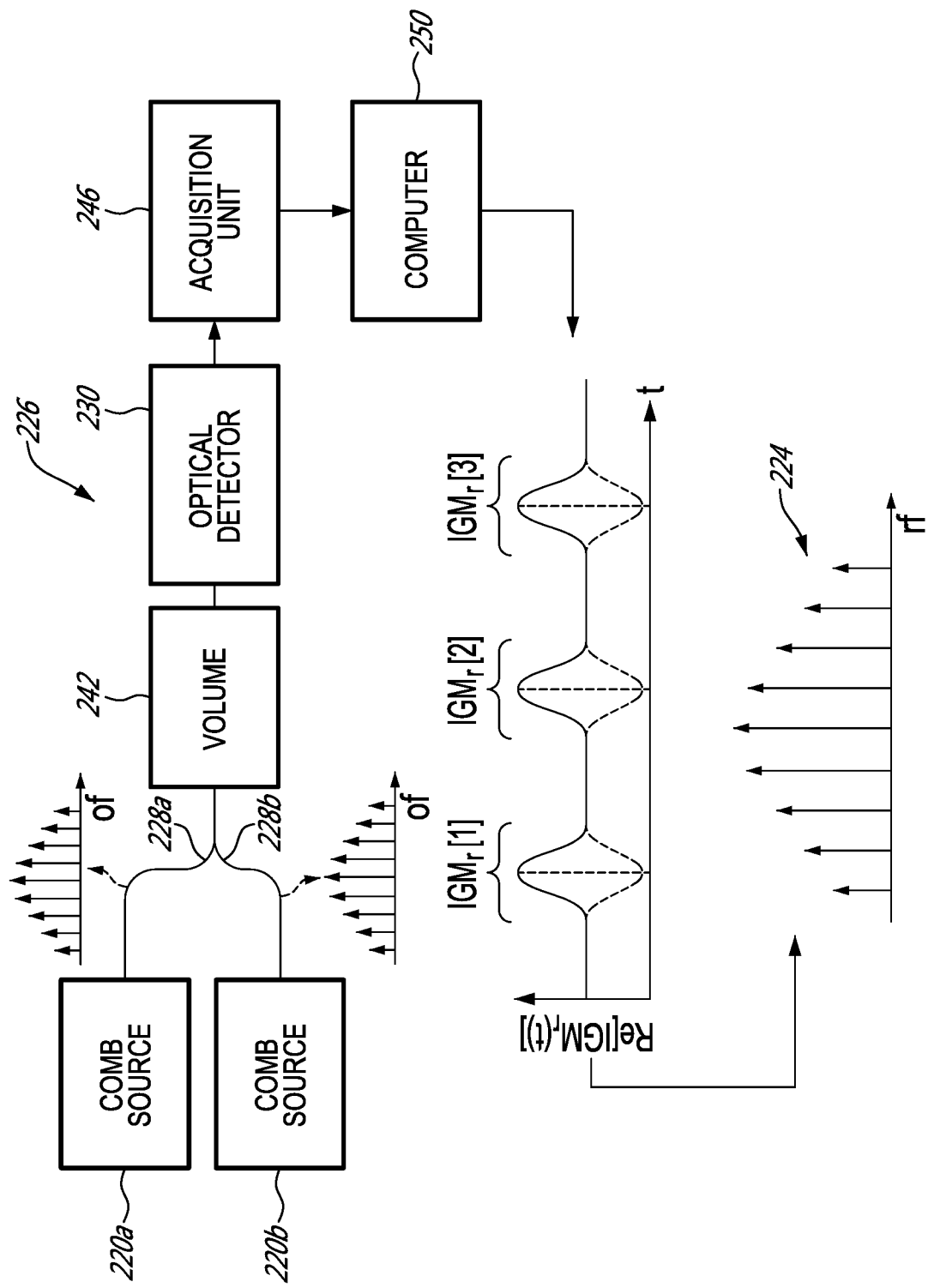
FIG. 15 is a schematic view of an example of a dual-comb interferometer configured to perform the method of FIG. 3 in post-processing using a computer, in accordance with an embodiment.

FIG. 15 shows an example of a dual-comb interferometer 226, in accordance with an embodiment. As depicted, similarly to the dual-comb interferometer 126, the dual-comb interferometer 226 has two free-running comb sources 220a, 220b configured to emit first and second optical fields 228a,228b having respective, different repetition rates. The optical detector 230 generates a beating interference signal as the first and second optical fields 228a,228b interfere with one another on the optical detector 230. The acquisition unit 246 acquisitions the beating interference signal generated by the optical detector 230 and stores dual-comb interferogram data onto a memory of the computer 250. Since the dual-comb interferogram data stored on the memory of the computer 250 is not corrected, it may not be usable. However, the computer 250 is configured to perform the methods described herein to determine any one of the relations(s) $\delta f(t)$, $\phi c1(t)$ or $\phi c2(t)$ and to correct the dual-comb interferogram data based on relations(s) $\delta f(t)$, $\phi c1(t)$ or $\phi c2(t)$. As can be understood, the corrected dual-comb interferogram data can have an electric comb spectrum 224, which shows distinguishable peaks and which can be usable in dual-comb interferometry.

In the example of FIG. 14, the volume 142 is interrogated by both the first and second optical fields 128a,128b. However, it will be understood that the volume 142 can be interrogated by only one of the first and second optical fields 128a,128b in some other embodiments.

Dual-Comb Spectrometer Example

The development of advanced spectrometers can lead to new insights into science and enables improvements in production environments through industrial process control. Spectrometer development took a step forward with the emergence of frequency combs; their broad and regularly-spaced modal structure makes them excellent sources to achieve active spectroscopy with frequency precision. However, this precision can be captured if the frequency components of the optical spectrum or comb mores are spectrally resolved.

Dual-comb spectroscopy is one of the few techniques able to resolve a complete set of dense comb modes. It maps the optical information to the more accessible radio-frequency (RF) domain using mutually coherent combs having slightly detuned repetition rates. Their coherence can be ensured by phase locking both combs together or to external references as shown in FIG. 2B, by using a post-correction method based on auxiliary lasers as described in U.S. Pat. Nos. 8,625,101 and 8,477,314, or by using an adaptive sampling scheme. However, all these approaches rely on external signals and additional hardware, which adds a significant layer of complexity to the dual-comb interferometer or spectrometer.

Some laser designs have recently been proposed to generate two slightly detuned combs from the same cavity in order to force a certain level of mutual coherence enabled by the rejection of common-mode noise. Most are based on non-reciprocal cavities that induce a repetition rate difference. The generation of two combs with different central wavelengths was also reported, but this avenue requires an additional step to broaden the lasers and obtain enough spectral overlap. However, having two pulse trains sharing the same gain and mode-locking media, which are both highly nonlinear, is worrisome as it could introduce delay-dependent distortions in interferograms (IGMs). Indeed, a pair of pulses overlapped in a nonlinear element could be significantly different from another pair interacting separately with the element. As a matter of fact, the long-known colliding-pulse laser exploits this effect to shorten the duration of its pulses. Dual-comb generation using two cavities integrated on a single platform avoids this concern and has been shown with few-mode semiconductor combs.

Even the common-mode designs above have difficulty to yield combs with sufficient relative stability to allow coherent averaging of data. Therefore, additional hardware and signals are still needed to track and compensate residual drifts. An interesting idea was recently suggested to extract those drifts directly from the IGMs using predictive filtering. Since it comes down to tracking the time-domain signal using a model made from the sum of the comb modes, the effectiveness of this approach still has to be demonstrated for cases where the number of modes reaches several thousand and where signal is only available momentarily in bursts near zero path difference (ZPD).

In this example, there is described a standalone and free-running dual-comb spectrometer based on two passively mode-locked waveguide lasers (WGLs) integrated in a single glass chip. This mutually stable system allows to fully resolve the comb modes after using a new method that corrects residual relative fluctuations estimated directly from the IGMs. Thus, no single-frequency lasers, external signals or control electronics are required to retrieve the mutual coherence, which tremendously simplifies the dual-comb interferometer. The design used in this example is also original and consists of two ultrafast-laser-inscribed waveguides in a chip of Er-doped ZBLAN, forming two mechanically coupled, but optically independent, laser cavities. Lasers are mode-locked using two distant areas of the same saturable absorber mirror (SAM). This design can avoid nonlinear coupling between combs while maximizing their mutual stability. In this example, the dual-comb interferometer is used as a dual-comb spectrometer to collect a 20-nm-wide absorption spectrum of the $2v_3$ band of hydrogen cyanide ($H^{13}C^{14}N$). The high quality of the spectral data (acquired in 71 ms) is validated by fitting Voigt lineshapes that return parameters in close agreement with published values.

Dual-Comb Spectrometer Design

WGLs are can be adapted to support dual-comb spectrometers. Indeed, several waveguides are typically available on a chip, they offer a much lower cavity dispersion than fibre lasers, thanks to the short propagation through glass, which facilitates mode-locking, and their small size can be compatible with the market's demand for small-footprint spectrometers. Furthermore, the transparency of ZBLAN from visible to mid-infrared allows for a broad range of emission wavelengths to be supported. Finally, rare-earth-doped glasses have proven to be excellent candidates for the generation of low-noise frequency combs of metrological quality, WGLs have been found to be advantageous for the centrepiece of a dual-comb interferometer.

Figure 16:
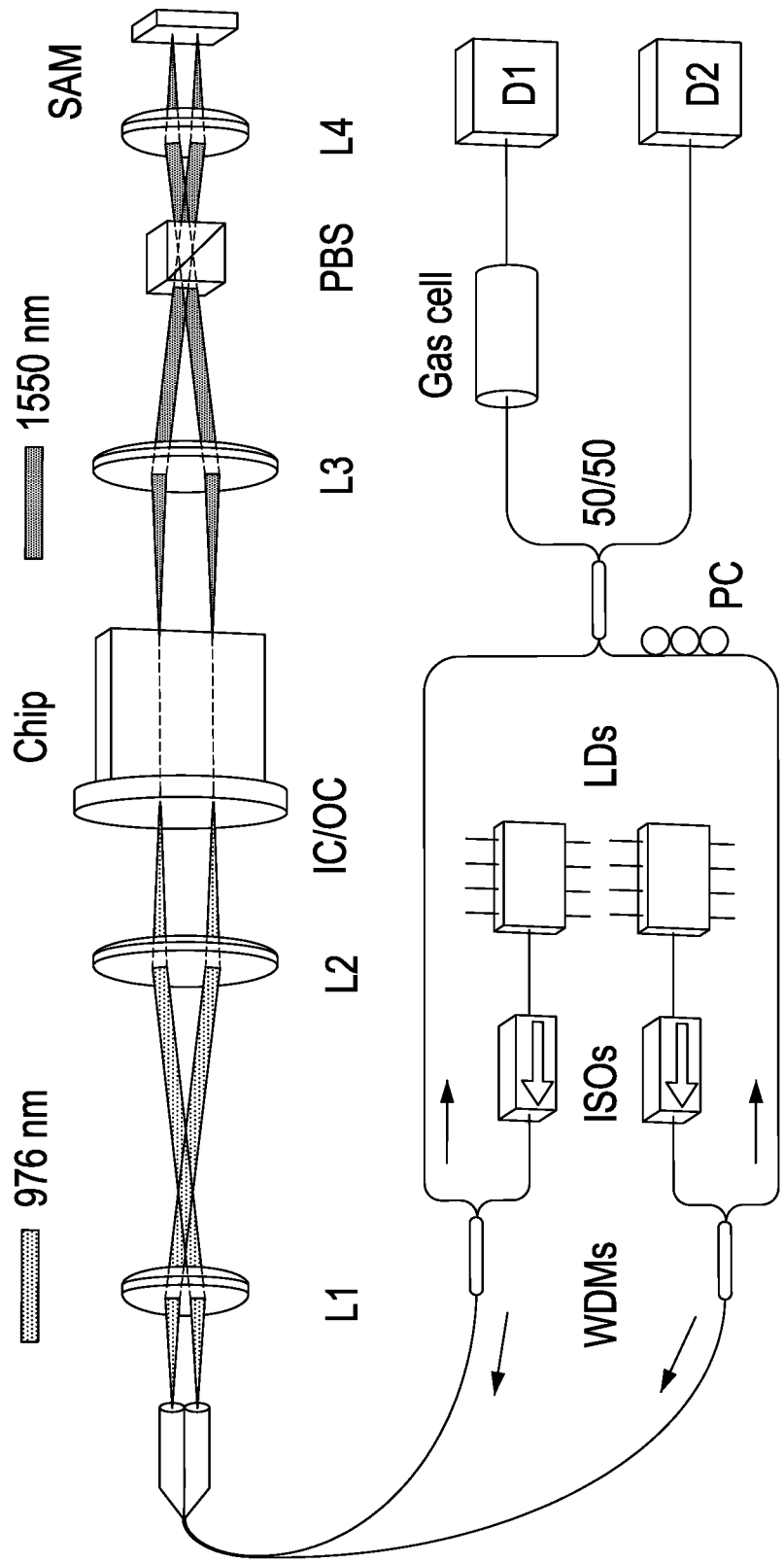
FIG. 16 shows a schematic view of a dual-comb spectrometer, in accordance with an embodiment.

FIG. 16 shows a schematic of the dual-comb spectrometer, whose single-cavity can be mode-locked to provide optical fields. It revolves around a 13-mm long ZBLAN glass chip containing several laser-inscribed waveguides with diameters ranging from 30 to 55 µm, which all support single-transverse-mode operation. The glass is doped with 0.5 mol % $Er^{3+}$, acting as the active ion, 2 mol % $Yb^{3+}$, which enhances pump absorption, and 5 mol % $Ce^{3+}$, which reduces excited-state absorption in $Er^{3+}$. As shown in FIG. 16, the two parallel waveguides laser-inscribed in an Er-doped ZBLAN glass chip are used to generate a pair of frequency comb lasers, which are mode-locked with a common SAM. The fibre-coupled outputs are used to perform dual-comb spectroscopy. In this figure, PC denotes polarization controller, and D1 and D2 denote detectors.

Two laser diodes (LDs) (Thorlabs BL976-PAG900), each capable of producing around 900 mW of single-transverse-mode power at 976 nm, are used to pump the chip. They go through separate isolators (ISOs) (Lightcomm HPMIIT-976-0-622-C-1) and the end of the output fibres are stripped, brought in contact along their side, and sandwiched between two glass slides with glue. The fibres are therefore held in place with a distance of 125 µm between cores and with the end facets lying in the same plane, which is just sticking out of the sandwich.

The output plane is imaged onto the chip with a pair of lenses (L1 and L2) arranged in an afocal configuration to couple the pump beams into a pair of waveguides separated by 600 µm (centre-centre). The lenses are chosen so that the ratio of the focal lengths best matches the required magnification set by the distance between waveguides and that between fibre cores (4.8 in this case). A software-assisted optimization of distances between components is performed for the chosen lenses in order to maximize coupling. Two parallel waveguides having diameters of respectively 45 and 50 µm are selected since it was observed that they yield the best efficiencies as a result of a good balance between mode matching and pump confinement. The large area of the waveguides ensures a low in-glass intensity, which increases the threshold for undesirable nonlinear effects.

An input coupler (IC), which also acts as an output coupler (OC), is butted against the left side of the chip in order to let the pump light in ($T_{976}$>95%) and to partially reflect the signal light ($R_{1550}$=95%). On the other side, a pair of anti-reflective coated lenses (L3 and L4) arranged in an afocal configuration is used to image the waveguide modes onto a SAM (Batop SAM-1550-15-12 ps) with a magnification of 0.16. This size reduction increases the fluence on the SAM, and thus its saturation, which permits the passive mode-locking of the lasers. A polarization beam splitter (PBS) is placed between lenses L3 and L4, where collimated beams cross, to allow a single linear polarization. Both cavities make use of the same components, which ensures maximum mutual stability.

The resulting mode-locked frequency combs exit their respective cavity at the OC and travel back towards the fibres to be collected. They are separated from the counter-propagating pumps with wavelength-division multiplexers (WDMs) (Lightcomm HYB-B-S-9815-0-001), which also include a stage of isolation for the signal wavelength. This conveniently gives two fibre-coupled frequency comb outputs that can be mixed in a 50/50 fibre coupler to perform dual-comb spectroscopy. Each cavity generates ~2 mW of comb power, of which around 10% is successfully coupled in the fibres. This is due to the alignment being optimized for the pump wavelength, thus the efficiency could be improved with an achromatic imaging system. Nevertheless, this level of power is more than sufficient for laboratory-based spectroscopy.

FIG. 17A shows the spectrum of each comb, as measured with an optical spectrum analyzer (Anritsu MS9470A). Their 3-dB bandwidth ($\Delta\lambda_{3\ dB}$) spans approximately 9 nm around 1555 nm and they show excellent spectral overlap. A zoomed view reveals spectral modulation that is identified as parasitic reflections taking place on the left surface of the OC and on the right surface of the chip. Even though anti-reflective coatings are deposited on those surfaces, the weak echoes are re-amplified through the chip and come out with non-negligible power. This issue can be solved with an angled and a wedged OC. As shown in FIG. 17A, the optical spectrums span 9 nm around 1555 nm and show excellent spectral overlap. The resolution bandwidth of the optical spectrum analyzer is set to 0.2 nm (0.03 nm for the inset).

The repetition rate $f_r$ of each comb is 822.4 MHz and their repetition rate difference $\Delta f_r$ is 10.5 kHz. This yields a beat spectrum fully contained within a single comb alias. Its central frequency is adjustable by varying the power of one of the pump diodes. As for $\Delta f_r$, it is mostly determined by the slight optical path differences through lenses and, potentially, through waveguides. Indeed, their diameters differ and this affects their effective refractive indices. Tuning $\Delta f_r$ is possible by slightly adjusting the alignment of optical components. FIG. 17B shows an averaged IGM obtained with a sequence of IGMs self-corrected using the method presented in the next section. Small pulses on either side of the ZPD burst correspond to the parasitic reflections mentioned earlier.

Figure 18:
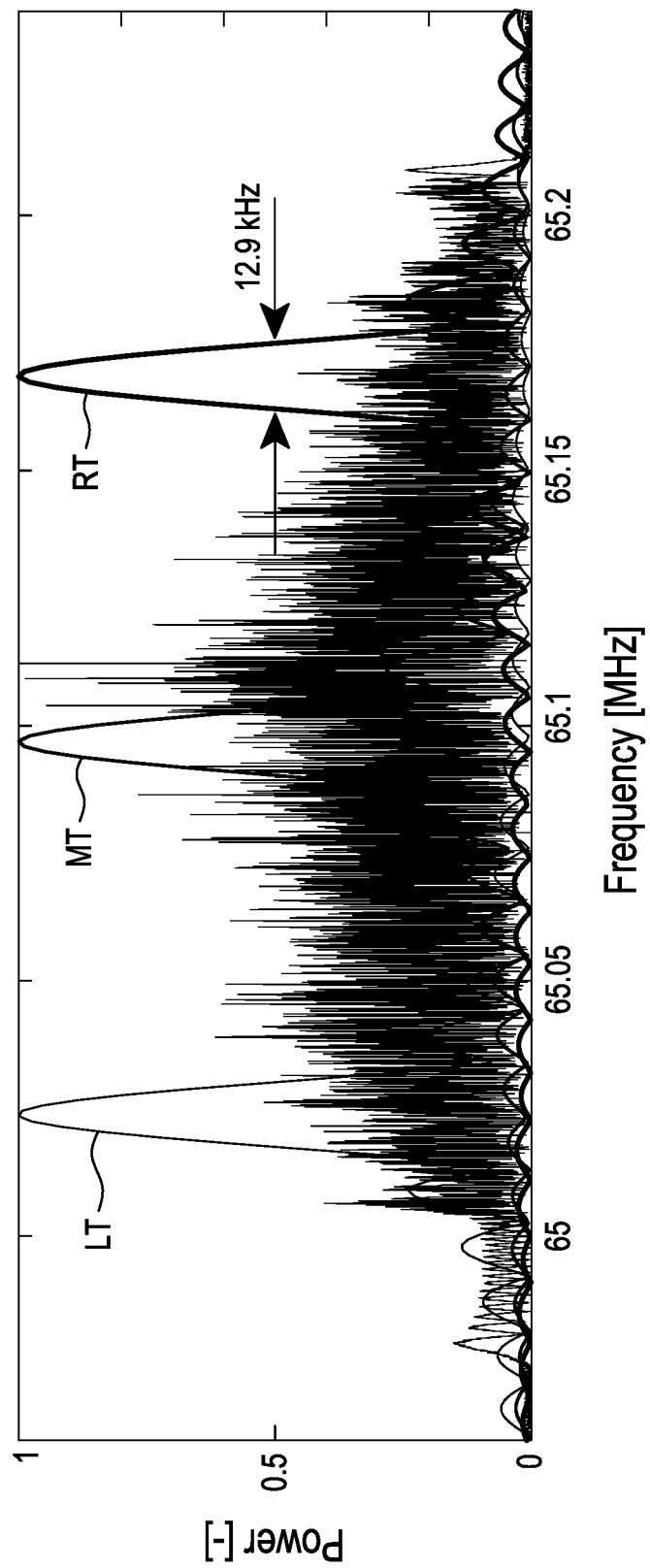
FIG. 18 is a graph showing an electrical spectrum of a beating interference signal, in accordance with an embodiment.

The mutual stability of the dual-comb spectrometer is evaluated using the beat note between two comb modes, one from each comb, measured through an intermediate continuous-wave (CW) laser. FIG. 18 shows the beat note computed from a 71 ms measurement (grey or background trace), which corresponds to the digitizer's memory depth at 1 GS/s, along with beat notes computed from three different sections of duration $1/\Delta f_r$~95 µs belonging to the longer measurement (left trace LT, middle trace MT, right trace RT). The left, middle and right traces LT, MT and RT are nearly transform-limited since their width (~12.9 kHz) approaches the bandwidth of a rectangular window (1.2Δf$_r$=12.6 kHz). This means that the dual-comb spectrometer is stable to better than Δf$_r$ on a 1/Δf$_r$ timescale, which consists of a key enabler for the self-correction method presented below. However, the beat note's central frequency oscillates on a slower timescale and turns into the wider grey trace (>10Δf$_r$) after 71 ms integration. This is mostly due to vibrations that slightly change the coupling of the pumps into the waveguides as well as the alignment of intra-cavity components.

Self-Correction

Although nothing forces the combs to settle individually at specific frequencies, the dual-comb spectrometer presented in this example is designed to provide them with mutual stability. Therefore, the frequency difference between pairs of comb modes is much more stable than their absolute frequencies. This is exactly what is required for mode-resolved dual-comb spectroscopy since the measured beat spectrum is a new RF comb with modes sitting at those differential frequencies. In order to reach a specified spectral resolution, the stability constraints on the RF comb need to be more severe than those on the optical combs by a factor equal to the compression ratio between the optical and RF domains f$_r$/Δf$_r$.

The RF comb is defined with only two parameters: its spectral offset and its spectral spacing. Mathematically, the RF modes are found at frequencies f$_n$=f$_c$+nΔf$_r$, where f$_c$ is the frequency of the mode closest to the carrier frequency (the spectrum's centre of mass) and n is the mode index. It was found judicious to define the comb around f$_c$ since this reduces the extent of n, which acts as a lever on Δf$_r$, and thus increases the tolerance on the knowledge of this parameter. Of course, f$_n$ is a time-dependent quantity since residual fluctuations δf$_c$(t) and δΔf$_r$(t) remain despite the design of the dual-comb spectrometer. The frequencies of the modes can thus be described at all times with $$f_n(t)=[f_c+\delta f_c(t)]+n[\Delta f_r+\delta \Delta f_r(t)]$$

When measuring dual-comb IGMs generated with free-running combs, it is required that those fluctuations are estimated and compensated for. This allows reaching the spectral resolution made available by the optical combs and it opens the door to coherent averaging by yielding mode-resolved spectra. As mentioned above with reference to the method 300 described with reference to FIG. 3, it was found possible to extract the residual fluctuations directly from the IGMs by making use of the cross-ambiguity function, a tool initially developed for radar applications. This tool is closely related to the cross-correlation, but besides revealing the time delay τ between two similar waveforms, it also reveals their frequency offset f$_0$. More specifically, the cross-ambiguity function gives a measure of the similarity of two waveforms, A$_1$(t) and A$_2$(t), as a function of τ and f$_0$. It is given by $$X_{1,2}(\tau,f_0)=\int_{-\infty}^{\infty}A_1(t)A^*_2(t+\tau)\exp(i\pi f_0 t)dt,$$

where * denotes complex conjugation. In the presence of chirp, an uncompensated frequency shift can affect the apparent delay between waveforms, as retrieved by the more familiar cross-correlation method. Hence, it is important that those two parameters are retrieved simultaneously from the point of maximum similarity on an ambiguity map, that is where |X$_{1,2}$(τ,F$_0$)| is maximum.

For a given dual-comb IGM stream, X$_{1,k}$(τ,δf$_c$) is computed between the first and k$^{th}$ ZPD bursts or beating features, where f$_0$ takes the form of a frequency offset δf$_c$ relative to the first burst's f$_c$ in that specific context. The values τ$_k$ and δf$_{c,k}$ at the maximum of each calculated ambiguity map reveal the instantaneous fluctuations sampled at each ZPD time of time difference. Indeed, time delays τ$_k$ translate into fluctuations δΔf$_r$(t), while δf$_{c,k}$ are samples from δf$_c$(t). FIG. 6 shows an ambiguity map generated from measured IGMs for the case k=100. Only ZPD bursts and their slightly overlapping adjacent echoes are used for the calculation. The latter are responsible for the weak modulation on the ambiguity map. More specifically, FIG. 6 shows a normalized ambiguity map generated from measured IGMs for the case k=100. The delay axis is centered on the expected delay k/Δf$_r$. The coordinates (τ$_k$, δf$_{c,k}$) at the point of maximum similarity are also given. Notice how the function takes large values along an oblique line, which illustrates the coupling between apparent delay and frequency offset when working with chirped IGMs.

Figure 19:
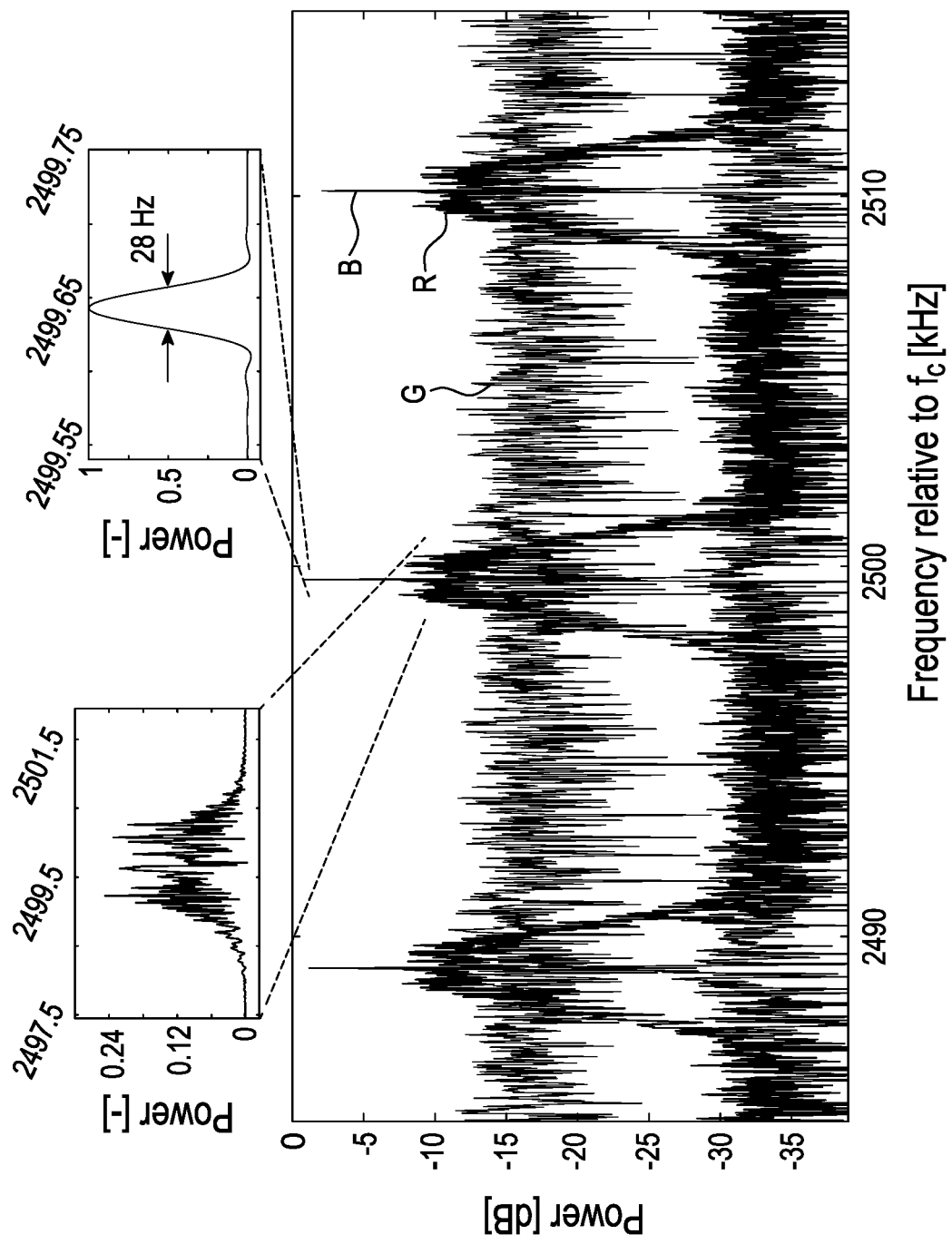
FIG. 19 is a graph showing the evolution of a small region of the electrical spectrum computed from a 71-ms-long beating interference signal, in accordance with an embodiment.
Figures 20A, 20B, 20C:
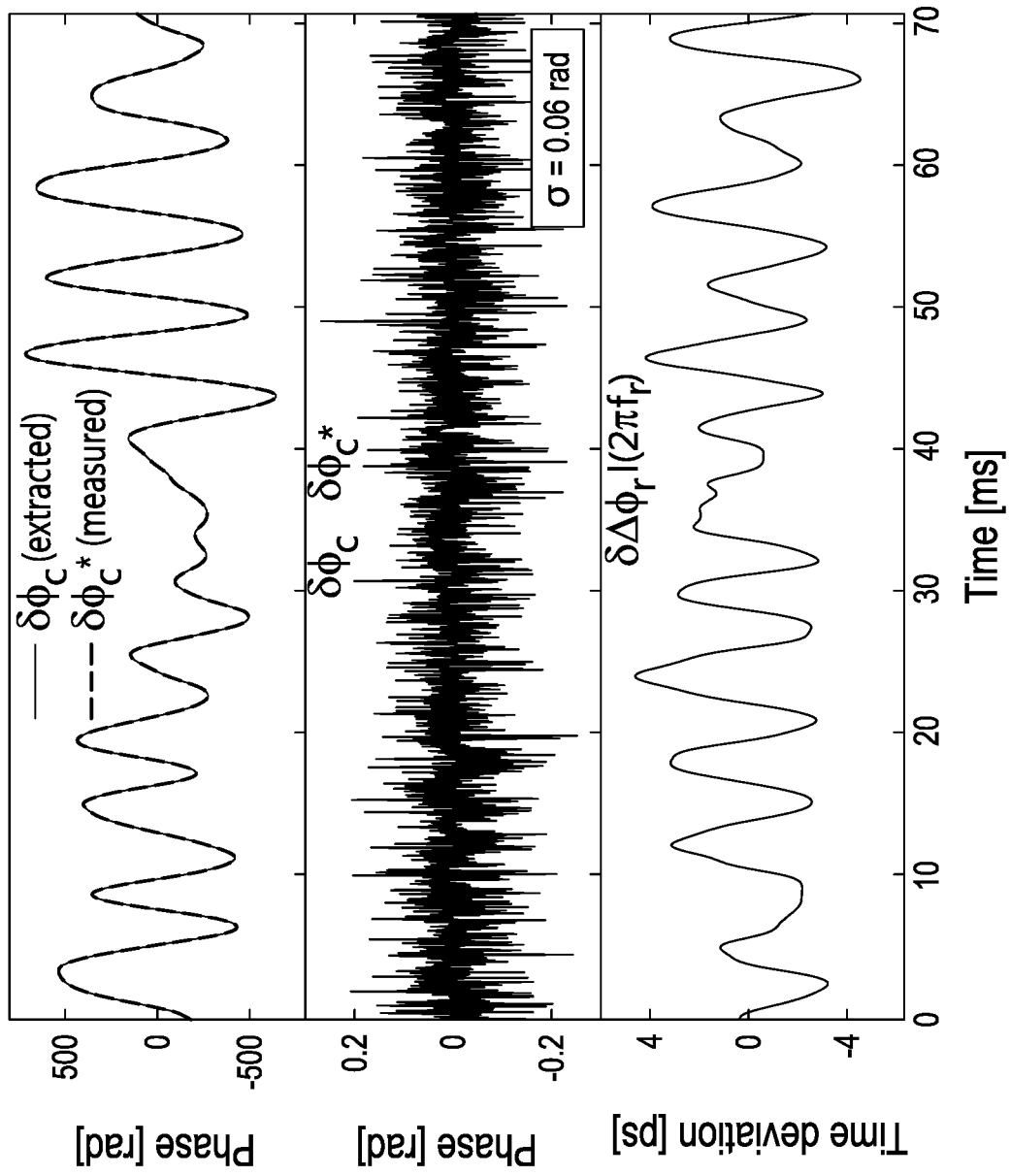
FIG. 20A is a graph showing a phase correction relation determined using the methods described herein and a phase correction relation measured through an intermediate CW laser, in accordance with an embodiment.
FIG. 20B is a graph showing the difference between the phase correction relations of FIG. 20A, in accordance with an embodiment.
FIG. 20C is a graph showing an extracted phase excursion relation $\delta\Delta\Phi_r(t)$ associated with the fluctuations on the repetition rate difference and normalized by $2\pi f_r$ to obtain time deviations from a linear delay grid, in accordance with an embodiment.

Initially, the uncorrected spectrum is completely smeared as shown by the trace G in FIG. 19 computed from a 71-ms-long IGM stream. This highlights the fact that, in the original spectrum, RF modes are wider than their nominal spacing. The spectral shifting is first compensated on the RF comb using a correction based on the values δf$_{c,k}$. They are used to estimate the continuous phase signal δΦ$_c$(t)=2π∫δf$_c$(t)dt required to perform a phase correction. This corrects the fluctuation of the mode at f$_c$(n=0), but leaves spectral stretching around that point uncompensated, as depicted by the higher-index modes of trace R in FIG. 19. Then, the values τ$_k$ are used to construct the continuous phase signal δΔΦ$_r$(t)=2π∫δf$_c$(t)dt associated with spectral stretching. This phase signal is used to resample the IGMs on a grid where the delay between pairs of optical pulses is linearly increasing (constant Δf$_r$). This yields the trace B in FIG. 19, which shows transform-limited modes having a width determined by the von Hann window that was used to compute all aforementioned spectra (2/(71×10$^{-3}$)=28 Hz). The improvement between the traces G and B indicates that this method allows accounting for fluctuations greater than the RF mode spacing. The extracted δΦ$_c$(t) is shown in FIG. 20A and the extracted δΔΦ$_r$(t) normalized by 2αf$_r$ to obtain time deviations from a linear delay grid, is shown in FIG. 20C. A detailed explanation of the method is given in the following paragraphs The method aims to correct both degrees of freedom on the RF comb: its spectral spacing and its spectral offset. This is done by determining the values τ$_k$ and δf$_{c,k}$ for each k$^{th}$ ZPD burst using the cross-ambiguity function and by deriving the continuous phase signals 8δΦ$_c$(t) and δΔΦ$_r$(t) in order to perform a correction as the one described. The spectrum is first shifted to DC with a phase ramp having the slope of the first IGM's carrier frequency f1. This slope is evaluated with a linear fit to the phase ramp in the first ZPD burst, which is in this case the reference beating feature. The values δf$_{c,k}$, which are measured at ZPD times deduced from the values τ$_k$, in order to obtain δf$_c$(t) for all times, are then interpolated. In other words, the value pairs are continuously interpolated (τ$_k$,δf$_{c,k}$) using a spline or any suitable type of continuous interpolation (e.g., linear). δf$_c$(t) is then integrated over time to retrieve the associated phase signal δΦ$_{c,1}$(t) and it us used to apply a first phase correction on the IGM stream. This operation corrects most of spectral shifting and starts to reveal the comb's modal structure. Although they can be distinguished, the modes still occupy a significant fraction of the mode spacing. At this point, the spectrum's centre of mass is aligned with DC because of the spectral shift that was initially applied. The mode closest to DC is the mode corresponds to n=0, which was initially at frequency $f_c$.

Since this first correction signal was obtained by integrating interpolated frequency data, it did not necessarily force the right set of phase values at ZPD times. Therefore, the phase correction can be refined further by extracting the residual phase excursions in the IGM stream. To do so, the first ZPD burst is cross-correlated with the rest of the IGM stream, which is safe now that most $\delta f_c(t)$ is compensated, and extract each burst's residual phase offset $\Phi_k$. As long as the first correction was seeded with adequately-sampled fluctuations, this $\Phi_k$ vector now contains sufficiently small jumps ($<\pi$) so that it can be unwrapped. The value pairs $\tau_k, \Phi_k$ are unwrapped and interpolated to create a second phase signal $\delta\Phi_{c,2}(t)$, which is used for a second phase correction that fully corrects the mode n=0 to a transform-limited peak at DC. The sum $\delta\Phi_{c,1}(t) + \delta\Phi_{c,2}(t) = \delta\Phi_c(t)$ represents the complete signal that would have been required to perform a one-off correction from the start. This steps can complete the correction of spectral shifting, but can leave the spectral stretching uncompensated. Note that the trace R in FIG. 19 corresponds to the spectrum corrected incrementally with both $\delta\Phi_{c,1}(t)$ and $\delta\Phi_{c,2}(t)$ or, equivalently, directly with $\delta\Phi_c(t)$. The solid line in FIG. 20A corresponds to the complete signal $\delta\Phi_c(t)$ and the dashed line corresponds to the measured $\delta\Phi^*_c(t)$.

Next, a phase vector that represents the evolution of the repetition rate difference is defined. The phase is set to 0 at the first ZPD time and it is incremented by $2\pi$ at successive ZPD times. This is justified by the fact that the arrival of ZPD bursts is periodic and each burst indicates the start of a new IGM. The value pairs $(t_k, 2\pi(k-1))$ are continuously interpolated for all times and the linear trend is removed on the resulting signal, which yields the continuous phase fluctuations $\delta\Delta\Phi_r(t)$. This data can finally be used to construct a resampling grid for the IGM stream where the delay between pairs of optical pulses is linearly increasing (constant $\Delta f_r$). This resampling correction compensates spectral stretching around the mode n=0 at DC.

Regarding the adjustment of $\delta\Phi^*_c(t)$. Before comparing $\delta\Phi_c(t)$ with its counterpart measured through a CW laser, a small adjustment on the latter can be first applied. Indeed, the pair of optical modes that is selected by the CW laser creates a beat note at a frequency $f_{CW}$ different from $f_c$. Therefore, the measured phase is adjusted by adding the signal $\delta\Delta\Phi_r(t)$ scaled by the factor $(f_c-f_{CW})/\Delta f_r$, the number of modes separating $f_{CW}$ from $f_c$. The result is the signal $\delta\Phi^*_c(t)$.

To verify the exactitude of the extracted signal $\delta\Phi_c(t)$, it is compared with an independent measurement of this quantity that is referred to as $\delta\Phi^*_c(t)$. It was obtained from the beat note between two comb modes, one from each comb, measured through an intermediate CW laser. This corresponds to the approach that is routinely taken in prior art to post-correct dual-comb IGMs. This yields the measured signal $\delta\Phi^*_c(t)$ (adjusted as described in Methods) shown in red in FIG. 20A, which can give the same information as the extracted signal $\delta\Phi_c(t)$. The difference between $\delta\Phi_c(t)$ and $\delta\Phi^*_c(t)$ is given in FIG. 20B and shows white residuals up to $\Delta f_r/2$, the Nyquist frequency of the sampled fluctuations. The standard deviation of the residuals is 0.06 rad, which corresponds to around one hundredth of a cycle, or 50 attoseconds at 1550-nm.

It is important to note that the method presented here can only compensate relative fluctuations that are slower than $\Delta f_r/2$ since they are effectively sampled by each ZPD burst. Anything above this frequency is aliased during sampling and contaminates the correction signals estimated in the 0 to $\Delta f_r/2$ band. As a rule of thumb, this method can thus be compatible with any dual-comb system for which the integral of the relative phase noise spectrum above $\Delta f_r/2 < \pi$, which guarantees aliased noise with standard deviation $<\pi$. In the case of the dual-comb spectrometer, this quantity is approximately 0.06 rad, as estimated by comparing the aliasing-sensitive $\delta\Phi_c(t)$ to the true measurement $\delta\Phi^*_c(t)$. Thus, it is concluded that a high $\Delta f_r$ and a low level of relative phase noise are desirable to achieve the best results. However, $\Delta f_r$ must always be smaller than $f_r^2/(2\Delta v)$, where $\Delta v$ is the optical combs' overlap bandwidth, in order to correctly map the optical information to a single comb alias.

Moreover, it is emphasized that the self-correction method simply permits retrieving the mutual coherence between comb modes from the IGMs themselves, which yields an equidistant, but arbitrary, frequency axis. Therefore, calibration against frequency standards or known spectral features is still required if an absolute frequency axis is needed.

Spectroscopy of HCN

The spectrometer is used to measure the transmission spectrum of the $2v_3$ band of $H^{13}C^{14}N$ by relying solely on the self-correction method presented above. The two frequency combs are mixed in a 50/50 coupler and send one output through a free-space gas cell (Wavelength References HCN-13-100). The 50-mm-long cell has a nominal pressure of 100±10 Torr and is at room temperature (22±1° C.). The optical arrangement is such that light does three passes in the cell. The transmitted light is sent to an amplified detector (Thorlabs PDB460C-AC) while the second couplers output goes straight to an identical detector that provides a reference measurement (see FIG. 16). This reference measurement is especially important to calibrate the spectral modulation present on the generated combs. Both signals are simultaneously acquired with an oscilloscope (Rigol DS6104) operating at 1 GS/s.

FIG. 21A shows a transmission spectrum acquired in 71 ms that covers up to 20 nm of spectral width. This allows to observe 24 absorption lines belonging to the P branch of $H^{13}C^{14}N$ with a spectral point spacing of $f_r$=822.4 MHz. The absolute offset of the frequency axis is retrieved by using one of the spectral features' known centre and its scale is determined by using the measured value for $f_r$. The plots presented in section II all come from the reference measurement used to compute this spectrum. The result are overlaid with a fit composed of 24 Voigt lines for which the Gaussian width (Doppler broadening) is determined by calculation from for a temperature of 22° C. (FWHM 450 MHz). The Lorentzian width (pressure broadening), centre and depth of each line are left as free parameters. The same approach is used as the one described in to fit the data and suppress the slowly varying background. The dominant structure left in the fit residuals is due to weak hot-band transitions. They represent the biggest source of systematic errors for the retrieved parameters since they often extend over lines of interest.

As a final proof that the correction method yields quality spectroscopic data, the Lorentzian half widths obtained from the fit are compared to values derived from theoretical broadening coefficients. Note that reference data is not available for all lines. The reference widths are calculated from reported broadening coefficients (in MHz/Torr) using a cell pressure of 92.84 Torr, which lies within the manufacturers tolerance. This pressure value yields minimum deviations between measured and reference widths and is in good agreement with the value of 92.5±0.8 Torr estimated from a different experiment using the same gas cell. The measurement uncertainties correspond to the 2σ confidence intervals returned by the fit. The excellent agreement between the two value sets confirms the reliability of the spectrometer and of its correction method. If the correction had left any significant fluctuations uncompensated, the spectrum would have appeared smeared, and the lines would have been broadened.

As can be understood, this example shows that the use of the dual-comb spectrometer of FIG. 16 based on passively mode-locked on-chip WGLs can improve the mutual stability of dual-comb systems by coupling the cavities mechanically and thermally. Combined with the method of FIG. 3, it was found possible to extract and compensate residual fluctuations in a manner that can allow a free-running comb interferometer to perform mode-resolved spectroscopy without using any external information. This self-correction approach to dual-comb interferometry may be used with any combs having sufficient mutual coherence on a $1/\Delta f_r$ timescale.

The resulting dual-comb spectrometer is compact and its self-correction approach represents an important step towards the widespread adoption of dual-comb spectroscopy. The design can be miniaturized down to a monolithic device with a SAM directly mounted on the end-face of the chip. Single- and dual-comb versions of the dual-comb spectrometer of FIG. 16 can reach multi-GHz repetition rates and compete against microresonator-based frequency combs. Moreover, the broad transparency of the ZBLAN chip makes the dual-comb spectrometer easily adaptable to the mid-infrared, a key enabler for useful spectroscopy applications.

As can be understood, the examples described above and illustrated are intended to be exemplary only. For instance, the reference beating feature can be provided in the form of a given one of the beating features of the dual-comb interferogram data or of the beating interference signal. In some embodiments, the reference beating feature can be stored on a computer-memory of the computer. In some other embodiments, the reference feature is stored in hardware such as in electrical filters or optical Bragg filters or gratings accessible by the processor. In some embodiments, the two optical fields can be provided in the form of two laser pulse trains generated by respective mode-locked lasers. The scope is indicated by the appended claims.

What is claimed is:

1. A method for performing dual-comb interferometry using a dual-comb interferometer, the method comprising:
    emitting first and second optical fields having respective, different repetition rates and respective optical comb spectrums;
    measuring a dual-comb beating interference signal resulting from the interference of the first and second optical fields with one another on an optical detector, the beating interference signal having a plurality of successive beating features indicative of the periodicity of the interference between the first and second optical fields;
    calculating, for each of at least two pairs of said beating features, each pair including a reference beating feature, a plurality of magnitude values by performing corresponding ambiguity functions between the corresponding beating features of the pair for a plurality of different combinations of relative time differences Ti and relative frequency offsets δfi;
    determining a frequency offset relation δf(t) by performing a continuous interpolation based on combinations of relative time difference τk and relative frequency offset δfk yielding maximum magnitude values calculated for corresponding pairs of said beating features; and
    correcting the dual-comb beating interference signal based on the frequency offset relation δt(t).

2. The method of claim 1 wherein the reference beating feature is a given one of the beating features of the beating interference signal.

3. The method of claim 1 wherein said correcting includes stabilizing the first and second optical fields of the dual-comb interferometer with one another based on the determined relation.

4. The method of claim 1 wherein said correcting includes measuring the beating interference signal based on the determined relation.

5. The method of claim 1 wherein said correcting includes storing corrected dual-comb interferogram data based on the corrected dual-comb beating interference signal.

6. The method of claim 1 further comprising
    determining a carrier frequency f1 of the reference beating feature; and
    removing frequency components associated with the carrier frequency f1 in the dual-comb interferogram data.

7. The method of claim 1 further comprising:
    determining a first phase correction relation ϕc1($t$) by integrating the frequency offset relation δf(t) over time; and
    correcting the dual-comb interferogram data by applying the first phase correction relation ϕc1($t$) to the dual-comb interferogram data.

8. The method of claim 1 further comprising:
    calculating, for each of at least two pairs of said beating features, each pair including the reference beating feature, a cross-correlation function between the corresponding beating features of the pair for a plurality of different relative time differences Ti;
    determining a second phase correction relation ϕc2($t$) by performing a continuous interpolation based on phase offset data sets (τk, ϕk) including the relative time differences τk yielding maximums of the cross-correlation functions calculated for corresponding pairs of said beating features and phase offsets ϕk associated to respective relative time differences τk; and
    correcting the dual-comb interferogram data by applying the second phase correction relation ϕc2($t$) to the dual-comb interferogram data.

9. The method of claim 1 wherein said determining includes adding an integer multiple of 2π to at least one of the phase offsets ϕk of the phase offset data sets (τk, ϕk) in a manner that consecutive phase offsets ϕk and ϕk+1 are within −π and +π from one another.

10. The method of claim 1 further comprising:
    determining resampling phase offset data sets (τk, ϕr) by associating consecutive multiples of 2π to consecutive relative time differences τk;
    determining a resampling phase relation ϕr(t) by performing a continuous interpolation based on the resampling phase offset data sets (τk, ϕr); and
    resampling the dual-comb interferogram data based on the resampling phase relation ϕr(t).

11. A method for characterizing a volume using dual-comb interferogram data generated by a dual-comb interferometer, the method comprising:
using at least a processor,
accessing the dual-comb interferogram data which includes a plurality of beating features;
calculating, for each of at least two pairs of said beating features, each pair including a reference beating feature, a plurality of magnitude values by performing corresponding ambiguity functions between the corresponding beating features of the pair for a plurality of different combinations of relative time differences Ti and relative frequency offsets δfi;
determining a frequency offset relation δf(t) by performing a continuous interpolation based on combinations of relative time difference τk and relative frequency offset δyielding maximum magnitude values calculated for corresponding pairs of said beating features;
correcting the dual-comb interferogram data based on the frequency offset relation δf(t); and
analyzing the volume based on the corrected dual-comb interferogram data.

12. The method of claim 11 wherein the dual-comb interferometer is a dual-comb spectrometer and the volume is a sample, wherein said analyzing includes analyzing the sample based on the corrected dual-comb interferogram data.

13. The method of claim 11 wherein the dual-comb interferometer is a dual-comb ranging system and the volume is a scene, wherein said analyzing includes analyzing the scene based on the corrected dual-comb interferogram data.

14. The method of claim 11 wherein the dual-comb interferometer is a dual-comb optical coherence tomography interferometer and the volume is a sample, wherein said analyzing includes analyzing the volume based on the corrected dual-comb interferogram data.

15. The method of claim 11 wherein the reference beating feature is a given one of the beating features of the dual-comb interferogram data.

16. The method of claim 11 wherein the method is performed using a computer including the processor and a computer-readable memory.

17. The method of claim 16 further comprising accessing data concerning the reference beating feature in the computer-readable memory.

18. The method of claim 11 wherein the processor is provided in the form of a field programmable gate array (FPGA).

19. The method of claim 18 wherein the reference beating feature is stored in a transfer function of a filter.

* * * * *